US011485535B2

(12) United States Patent
Rizzo et al.

(10) Patent No.: US 11,485,535 B2
(45) Date of Patent: Nov. 1, 2022

(54) ARTICLE WITH VISUAL EFFECT

(71) Applicant: The Procter & Gamble Company, Cincinnati, OH (US)

(72) Inventors: Nicole Ashley Rizzo, Cincinnati, OH (US); Joseph Henry Nurre, West Chester, OH (US); Marc Andrew Mamak, Mason, OH (US); Joseph Craig Lester, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 366 days.

(21) Appl. No.: 16/720,052

(22) Filed: Dec. 19, 2019

(65) Prior Publication Data

US 2020/0198830 A1 Jun. 25, 2020

Related U.S. Application Data

(60) Provisional application No. 62/925,358, filed on Oct. 24, 2019, provisional application No. 62/781,803, (Continued)

(51) Int. Cl.
*B65D 1/40* (2006.01)
*B29C 49/06* (2006.01)
(Continued)

(52) U.S. Cl.
CPC ............ *B65D 1/40* (2013.01); *B29B 11/08* (2013.01); *B29C 49/06* (2013.01); *B29C 49/071* (2022.05);
(Continued)

(58) Field of Classification Search
CPC ...... B65D 1/40; B65D 1/0215; B65D 1/0207; B65D 1/0223; B29B 11/08; B29C 49/06; B29C 49/12; B29C 49/22; B29C 49/24
(Continued)

(56) References Cited

U.S. PATENT DOCUMENTS 2,669,752 A 2/1954 Pratt
3,674,512 A 7/1972 Andros
(Continued)

FOREIGN PATENT DOCUMENTS

CN 1953862 A 4/2007
CN 102026793 A 4/2011
(Continued)

OTHER PUBLICATIONS

Anonymous: "Color difference—Wikipedia", Jan. 1, 2005 (Jan. 1, 2005), pp. 1-5, XP05533558, Retrieved from the Internet:URL:https://en.wikipedia.org/wiki/Color difference.
(Continued)

*Primary Examiner* — Robert J Hicks
(74) *Attorney, Agent, or Firm* — Steven Robert Chuey; David M Weirich

(57) ABSTRACT

A blow molded article having a body portion that includes one or more walls surrounding an interior space. The one or more walls have an article inner surface, an article outer surface, and a wall thickness. At least a portion of the one or more walls includes one or more effect structures each having an effect surface normal having an orientation. Further there is a first region including a plurality of first effect structures having a first Average Normal Orientation, a second region including a plurality of second effect structures having a second Average Normal Orientation which is different from the first Average Normal Orientation, and a visual effect resulting from the difference between the first Average Normal Orientation of the effect structures in the first region and the second Average Normal Orientation of the effect structures in the second region.

22 Claims, 20 Drawing Sheets

Related U.S. Application Data filed on Dec. 19, 2018, provisional application No. 62/781,793, filed on Dec. 19, 2018.

(51) Int. Cl.

| | | |
|---|---|---|
| *B29C 49/12* | (2006.01) | |
| *B65D 1/02* | (2006.01) | |
| *B29B 11/08* | (2006.01) | |
| *B29C 49/22* | (2006.01) | |
| *B29C 49/24* | (2006.01) | |
| *B29C 49/00* | (2006.01) | |
| *B29K 101/12* | (2006.01) | |
| *B29L 31/00* | (2006.01) | |

(52) U.S. Cl.
CPC .............. *B29C 49/12* (2013.01); *B29C 49/22* (2013.01); *B29C 49/24* (2013.01); *B65D 1/0215* (2013.01); *B65D 1/0223* (2013.01); *B29C 2949/0724* (2022.05); *B29C 2949/0746* (2022.05); *B29C 2949/3028* (2022.05); *B29C 2949/3032* (2022.05); *B29C 2949/3034* (2022.05); *B29K 2101/12* (2013.01); *B29K 2995/0018* (2013.01); *B29L 2031/7158* (2013.01)

(58) Field of Classification Search
USPC ...... 220/675, 670, 669, 62.22, 62.12, 62.11; 215/12.1, 382, 383, 44, 43; 206/459.5; 428/36.91, 36.9, 35.7
See application file for complete search history.

(56) References Cited

U.S. PATENT DOCUMENTS

| | | | |
|---|---|---|---|
| 4,233,262 A | 11/1980 | Curto | |
| 4,339,409 A | 7/1982 | Curto | |
| 5,312,572 A | 5/1994 | Horwege | |
| 5,397,610 A | 3/1995 | Odajima et al. | |
| 5,840,386 A | 11/1998 | Hatch et al. | |
| 5,894,041 A | 4/1999 | Cornell | |
| 7,763,179 B2 | 7/2010 | Levy | |
| 8,522,989 B2* | 9/2013 | Uptergrove | B65D 23/0807 215/12.2 |
| 2004/0144746 A1 | 7/2004 | Tanaka et al. | |
| 2006/0131793 A1 | 6/2006 | Tanaka et al. | |
| 2006/0263554 A1 | 11/2006 | Yamada et al. | |
| 2010/0104697 A1* | 4/2010 | Kriegel | B65D 85/73 426/106 |
| 2011/0089135 A1 | 4/2011 | Simon | |
| 2012/0193320 A1 | 8/2012 | Stanca et al. | |
| 2013/0059102 A1 | 3/2013 | Torchio et al. | |
| 2013/0228249 A1* | 9/2013 | Gill | B65D 1/0223 220/666 |
| 2013/0307197 A1 | 11/2013 | Haesendonckx et al. | |
| 2015/0352772 A1 | 12/2015 | Feuilloley et al. | |
| 2016/0375608 A1 | 12/2016 | Pijls | |
| 2017/0204251 A1* | 7/2017 | Agerton | C08K 5/5419 |
| 2018/0305064 A1* | 10/2018 | Lane | B65D 1/0276 |
| 2020/0024021 A1 | 1/2020 | Agerton et al. | |
| 2020/0198212 A1 | 6/2020 | Rizzo et al. | |
| 2020/0198213 A1 | 6/2020 | Rizzo et al. | |
| 2020/0198829 A1 | 6/2020 | Rizzo et al. | |
| 2022/0127036 A1 | 4/2022 | Rizzo et al. | |

FOREIGN PATENT DOCUMENTS

| | | |
|---|---|---|
| CN | 102636376 A | 9/2012 |
| CN | 102933369 A | 2/2013 |
| CN | 103958178 A | 7/2014 |
| EP | 0553845 B1 | 4/1998 |
| EP | 2832654 A1 | 2/2015 |
| FR | 2916674 A1 | 12/2008 |
| FR | 2898293 B1 | 8/2012 |
| GB | 1110703 A | 4/1968 |
| JP | H01257024 A | 10/1989 |
| JP | 2013075465 A | 4/2013 |
| JP | 2014108796 A | 6/2014 |
| KR | 20160124241 A | 10/2016 |
| WO | WO9902324 A1 | 1/1999 |
| WO | WO2005115721 A1 | 12/2005 |

OTHER PUBLICATIONS

International Search Report and Written Opinion; Application Ser. No. PCT/US2019/067321, dated Apr. 7, 2020, 19 pages.
All Office Actions; U.S. Appl. No. 16/720,056.
All Office Actions; U.S. Appl. No. 16/720,072.
U.S. Appl. No. 16/720,036, filed Dec. 19, 2019, Nicole Ashley Rizzo et al.
U.S. Appl. No. 16/720,044, filed Dec. 19, 2019, Nicole Ashley Rizzo et al.
U.S. Appl. No. 16/720,047, filed Dec. 19, 2019, Nicole Ashley Rizzo et al.
U.S. Appl. No. 16/720,056, filed Dec. 19, 2019, Nicole Ashley Rizzo et al.
U.S. Appl. No. 16/720,072, filed Dec. 19, 2019, Nicole Ashley Rizzo et al.
All Office Actions; U.S. Appl. No. 16/720,036, filed Dec. 19, 2019.
All Office Actions; U.S. Appl. No. 16/720,044, filed Dec. 19, 2019.
All Office Actions; U.S. Appl. No. 16/720,047, filed Dec. 19, 2019.
All Office Actions; U.S. Appl. No. 17/569,576, filed Jan. 6, 2022.
All Office Actions; U.S. Appl. No. 17/703,123, filed Mar. 24, 2022.
U.S. Unpublished U.S. Appl. No. 17/703,123, filed Mar. 24, 2022, to Joseph Craig Lester et al.

* cited by examiner

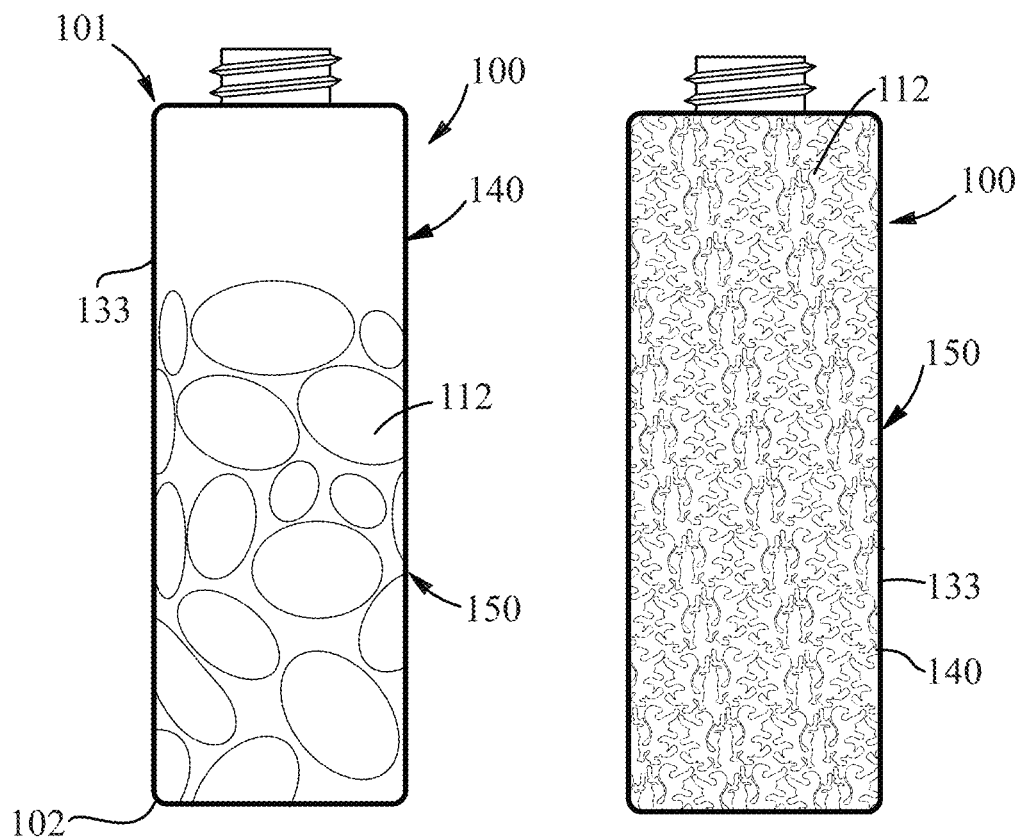

ARTICLE WITH VISUAL EFFECT

FIELD OF THE INVENTION

The present invention relates to articles with unique visual effects, preforms for blow molded articles, and methods for making such articles and preforms.

BACKGROUND OF THE INVENTION

Articles made of thermoplastic materials are popular in various industries, including containers for consumer goods, food and beverages. Blow molded packages, such as bottles, are one popular type of thermoplastic container. Blow molded packages are made by first creating a preform that is subsequently expanded in a mold, generally with air or another gas under high pressure, to form the resulting article. For certain articles, stretch blow molding is used where the preform is softened and/or stretched while in the mold prior to being expanded into the final article.

Although blow molding has been found to be an effective and efficient process for manufacturing articles such as containers and the like, the requirements of the process can make it difficult to provide articles with certain aesthetic and/or tactile qualities or characteristics. For example, it may be desirable to provide an article with one or more aesthetic features or visual effects, such as, for example, aesthetic features that have a three-dimensional appearance or aesthetic features that have or appear to have some depth or texture. Such features may be desirable in mono-layer articles or in multi-layer articles and may be desirable whether the surface of the article is smooth or textured. However, typical preform manufacturing and blow molding process often limit the available options for the aesthetic appearance of the outer surface of the article because of the steps used to make preforms, the high cost of the molds for the blow molding process, and the processing requirements needed to blow the preform into the final article.

Thus, it would be desirable to provide improved aesthetic and/or tactile features on blow molded and other articles. It would also be beneficial to provide an improved process for manufacturing blow molded articles to allow for a greater range of aesthetic and/or tactile features. It would also be desirable to provide an improved method of forming preforms for blow molded articles that allows the resulting blow molded articles to have a greater range of aesthetic features and/or to allow such aesthetic features to be modified quickly and cost effectively. Further still, it would be desirable to provide improved aesthetic features on blow molded and other articles while keeping the process simple, cost-effective and scalable to mass manufacture. It would also be desirable to provide blow molded articles having dimensional visual effects with the appearance of depth, dimension (e.g. 3D), or texture while maintaining a generally smooth outer surface on the article. Even further, it would be desirable to provide improved aesthetic features on blow molded and other articles using conventional equipment.

The invention disclosed herein may provide any one or more of the described or other features and/or benefits and such features and/or benefits may be provided separately or in any desired combination.

SUMMARY OF THE INVENTION

The present invention provides a solution for one or more of the deficiencies of the prior art as well as other benefits.

The specification, claims and drawings describe various features and embodiments of the invention, including a blow molded article comprising a body portion including one or more walls surrounding an interior space, the one or more walls having an article inner surface, an article outer surface, and a wall thickness, wherein at least a portion of the one or more walls includes one or more effect structures each having an effect surface normal having an orientation; a first region including a plurality of first effect structures having a first Average Normal Orientation; a second region including a plurality of second effect structures having a second Average Normal Orientation which is different from the first Average Normal Orientation; and a visual effect resulting from the difference between the first Average Normal Orientation of the effect structures in the first region and the second Average Normal Orientation of the effect structures in the second region.

The present invention also includes a preform for blow molding formed from a thermoplastic material, the preform comprising a body having one or more walls extending from an opening to a base, the walls having one or more layers; a preform outer surface; a preform inner surface; a three-dimensional pattern of one or more cavities or protrusions formed on one or more of the layers of the preform; and a plurality of effect structures disposed in the one or more layers of the one or more walls, the plurality of effect structures each having an effect surface.

BRIEF DESCRIPTION OF THE DRAWINGS

FIG. 5 is a plan view of an article in accordance with the present invention.

FIG. 6 is a plan view of an article in accordance with the present invention.

DETAILED DESCRIPTION OF THE INVENTION

Figure 1:
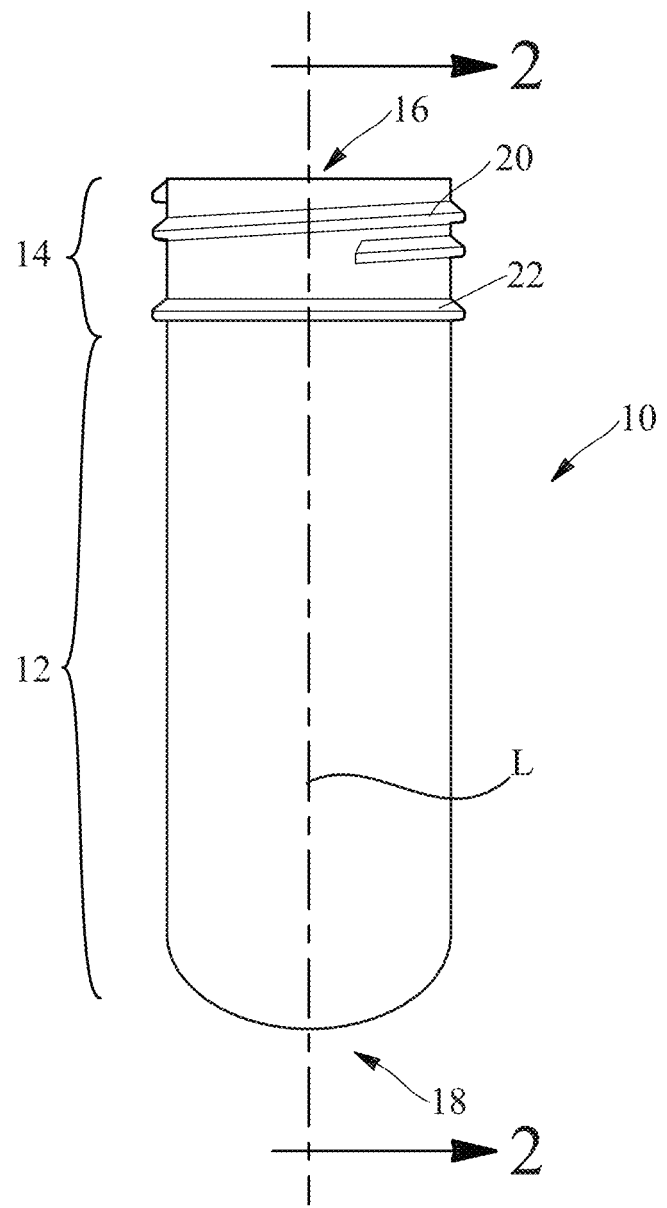
FIG. 1 is a plan view of a preform in accordance with the present disclosure.

"Article", as used herein refers to an individual object for consumer usage, e.g. a container suitable for containing materials or compositions. The article may be a container, non-limiting examples of which include bottles, tubes, drums, jars, cups, and the like and may be blow molded or formed by another process. The compositions contained in such a container may be any of a variety of compositions including, but not limited to, detergents (e.g., laundry detergent, fabric softener, dish care, skin and hair care), beverages, powders, paper (e.g., tissues, wipes), beauty care compositions (e.g., cosmetics, lotions), medicinal, oral care (e.g., tooth paste, mouth wash), and the like. Containers may be used to store, transport, and/or dispense the materials and/or compositions contained therein.

"Blow molding" refers to a manufacturing process by which hollow cavity-containing articles are formed. In general, there are three main types of blow molding: extrusion blow molding (EBM), injection blow molding (IBM), and injection stretch blow molding (ISBM). The blow molded articles of the present invention can be made via EBM, IBM or ISBM, or any other known or developed blow molding method, all of which are referred to herein simply as blow molding. The blow molding process typically begins with forming a precursor structure or "preform" that is ultimately expanded into the final article. The preform, as used herein, can be any shape or configuration, but is often in the general shape of a tube with at least one open end, or two open ends. Examples of preforms include, but are not limited to, parisons (the name often given to precursor structures used in extrusion blow molding), preforms, and other precursor structures used in different blow molding techniques. Preforms, as used herein, can be formed by extrusion, injection, compression molding, 3D printing and other know or developed methods. Injection molding of the preform can be simple injection molding of a single material, co-injection of two or more materials in a single step and/or over-molding preformed in two or more steps. The injection step can be closely coupled to a blowing step, as in IBM, 1-step ISBM or 1.5-step ISBM, or can be decoupled in a secondary operation such as 2-step ISBM. During blow molding, a perform or other precursor structure is typically clamped into a mold and a fluid, often compressed air, is directed into the preform through the opening to expand the preform to the shape of the mold. Sometimes the preform is mechanically stretched prior to or at the same time the fluid is introduced (known as "stretch blow-molding"). Also, the perform may be heated or cooled before the fluid is introduced. The pressure created by the fluid pushes the thermoplastic out to conform to or partially conform to the shape of the mold containing it. Once the plastic has cooled and stiffened, the mold is opened and the formed article is ejected.

As used herein, a "blow molded article" is an article formed by blow molding. Such articles have unique physical and structural attributes that are well known by those of ordinary skill in the art and are not limited by the particular blow molding method or technique used to make the article.

As used herein, an "effect pigment" is a "metal effect pigment" or a "special effect pigment." Metal effect pigments include metallic platelet-shaped particles that create a metal-like luster by reflection of light at the surface of the metal platelet-shaped particles. Special effect pigments include all other platelet-like effect pigments which cannot be classified as metal effect pigments. Special effect pigments generally include platelet-shaped particles (or crystals) such as mica (natural or synthetic), borosilicate glass, alumina flakes, bismuth oxychloride, and silicon dioxide flakes. The platelet-shaped particles may be coated with one or more materials including, titanium dioxide, iron oxide, other metal oxides, silicon dioxide, aluminum oxide and/or other oxides. Such coatings may provide, for example, enhanced chromatic strength, improved reflection or other benefits. Examples of special effect pigments include "pearlescent pigments" (also referred to as "pearl luster pigments"), "interference pigments", and "nacreous pigments". These pigments can exhibit pearl-like luster as a result of reflection and refraction of light, and depending on the thickness of the coating, they can also exhibit interference color effects. Interference pigments are defined as special effect pigments whose color is generated completely or predominantly by the phenomenon of interference of light. Other effect pigments may provide, for example, multi-color effects (also called goniochromatic), color travel effects, color flop effects, or color-shifting (e.g. where the observed color changes with viewing angle) can be provided using layers and/or coatings with alternating refractive indices.

Effect pigments, including pearlescent and interference pigments are marketed as such by suppliers including Merck KGaA and BASF SE. Metal effect pigments are marketed by such suppliers including Eckart and Schlenk AG. Color shifting effect pigments include Colorstream® from Merck and Firemist® Colormotion from BASF.

The term "etch" as used herein as a noun, refers to the cavity formed when material is removed from a surface. As a verb, the terms "etch" and "etching" refers to the act of removing material from a surface. Etching can be performed mechanically, chemically and thermally (e.g. laser). Although there is no specific limitation on the maximum or minimum depth of an etch, etching depths are typically in the range of about 0.001 mm to about 2.0 mm, including any depth within the range, such as for example, 0.010 mm, 0.075 mm, 0.100 mm, 0.200 mm, 0.300 mm, 0.400 mm, 0.500 mm, 1.0 mm, 1.5 mm and others.

The term "layer" in the context of the present invention means a thickness of material that is generally continuous and typically homogeneous in terms of its chemical makeup. However, it is contemplated that any particular layer may have discontinuities and/or non-homogeneous materials or regions in certain configurations, including but not limited to pigments, effect pigments, dyes and other materials within the layer.

The term "opaque" as used herein means the material, layer, article, or portion of the article being measured has total luminous transmittance of 0%. The total luminous transmittance is measured in accordance with ASTM D1003.

The terms "platelet-like shape" and "platelet-like shaped" refer to particles that have at least one side that is generally planar. Typically, platelet-like shaped particles will have two dimensions that are significantly larger than a third dimension (e.g. length and width versus thickness) and are often shaped like disks, rectangular parallelepipeds, regular or irregular polygons. When platelet-like shaped particles are used in effect pigments, the most prominent generally planar surface of the particle can be referred to as the "effect surface".

The term "translucent" as used herein means the material, layer, article, or portion of the article being measured has total luminous transmittance of greater than 0% and less than or equal to 90%.

The term "transparent" as used herein means the material, layer, article, or portion of the article being measured has total luminous transmittance of 90% or more.

Preform:

As noted above, preforms are commonly used in blow molding processes. An exemplary preform 10 is shown in FIG. 1. The preform 10 has a body 12, and at least one open end 16 having an opening 34. The preform 10 may also include a neck or finish 14, and a closed end 18 disposed opposite of the open end 16. The finish 14 of the preform 10 may include one or more threads 20 or other structures that can be used in the resulting article to engage with a cap or other closure device. The neck 14 can also include a transfer ring 22 or other structure that can aid in the manufacturing process.

The preform 10 can be used in a blow molding process to provide a preliminary structure that can be transformed into a final article, such as a blow-molded article or bottle, by means of directing a pressurized fluid into the open end 16 of the preform 10 while the preform 10 is disposed in a mold in the shape of the final article (or an interim article). Typically, the preform 10 may be heated or otherwise manipulated mechanically or chemically to soften the material of the preform 10 prior to introduction of the pressurized fluid to allow the preform 10 to expand into the shape of the mold without shattering or cracking. More details relating to exemplary blow molding processes in accordance with the present invention are described below.

Figure 2:
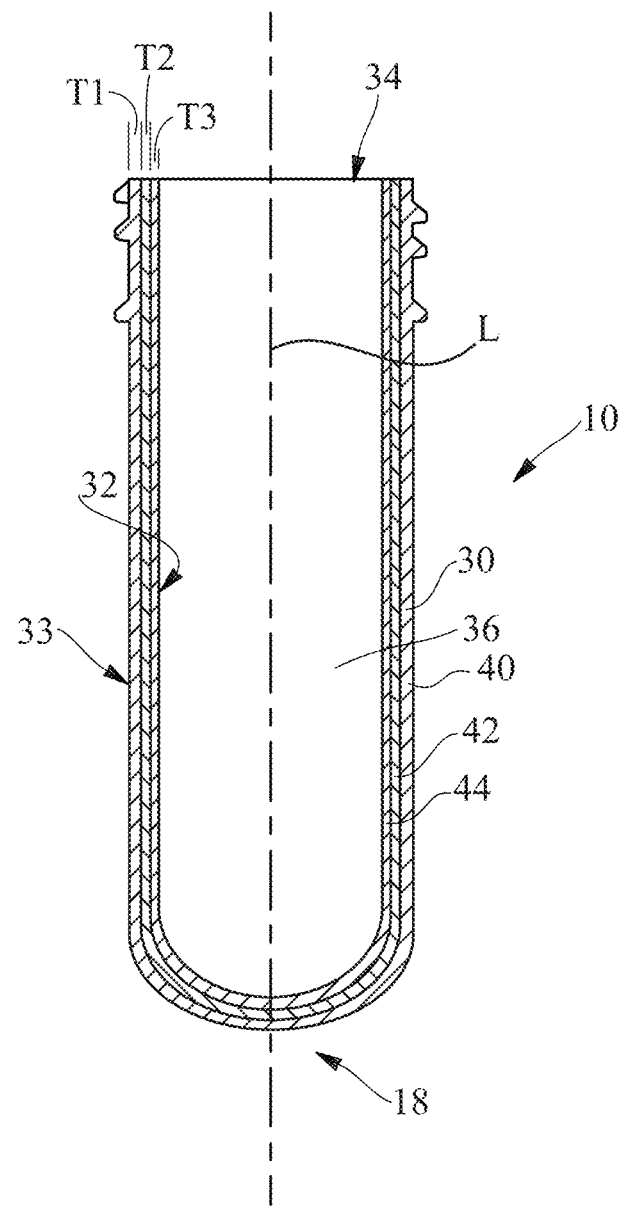
FIG. 2 is a cross-section view of the preform of FIG. 1 taken through 2-2.

Generally, the preform 10 is formed separately from the blow molding step. The preform 10 can be formed by any suitable method, including but not limited to molding, extrusion, 3D printing, or other known or developed processes. The preform 10 may be formed from a single material or may include layers or regions of different materials. FIG. 2 is an enlarged cross-section of the preform 10 shown in FIG. 1 taken through section line 2-2. As shown, the preform 10 includes one or more preform walls 30, closed end 18 and interior space 36. The preform walls 30 have an inner surface 32 adjacent the interior space 36 and an outer surface 33 forming the exterior of the preform 10. Typically, but not necessarily, the preform walls 30 are between about 1.0 mm and about 6 mm thick.

The preform walls 30 are shown in FIG. 2 as having three layers, outer layer 40, intermediate layer 42 adjacent to, but inward from outer layer 40, and inner layer 44. Although three layers are shown, any number of layers can be used, including a single layer, two or more layers, three or more layers or any other number of layers. Also, although in FIG. 2 the layers are shown to extend throughout the entire length of the preform 10, any one or more layers may extend only part way through the preform 10.

The layers 40, 42 and 44 may each have a thickness, T1, T2 and T3. The thickness T1, T2, and T3 of each layer 40, 42 and 44 may be the same or may be different from one or more of the other thicknesses. Further, the thickness of any given layer may change throughout the preform 10. For example, the thickness of any layer may randomly change, may change in a predetermined pattern, may change in the direction of the length of the preform 10 and/or may change about the circumference of the preform 10 walls 30. The layers may be made of the same material or different materials. They may also be the same or different colors or have the same or different luminous transmittance. For example, the outer layer 40 may be transparent and the inner layer 44 or intermediate layer 42 may have a color or be translucent or opaque, although any other combinations of layers with the same or different luminous transmittance are contemplated. By including layers with different colors and/or different luminous transmittance, the article formed from the preform 10 can have interesting and/or unique aesthetic characteristics.

A preform 10 or article according to the present invention may be formed of a single thermoplastic material or resin or from two or more materials that are different from each other in one or more aspects. Where the preform 10 has different layers, the materials making up each of the layers can be the same or different from any other layer. For example, the preform 10 or article may comprise one or more layers of a thermoplastic resin, selected from the group consisting of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), or a polyolefin, for example one of low-density polyethylene (LDPE), linear low-density polyethylene (LLPDE), high-density polyethylene (HDPE), propylene (PP) and a combination thereof.

Recycled thermoplastic materials may also be used, e.g., post-consumer recycled ("PCR") materials, post-industrial recycled ("PIR") materials and regrind materials, such as, for example polyethylene terephthalate (PCRPET), high density polyethylene (PCRHDPE), low density polyethylene (PCRLDPE), polyethylene terephthalate (PIRPET) high density polyethylene (PIRHDPE), low density polyethylene (PIRLDPE) and others. The thermoplastic materials may include a combination of monomers derived from renewable resources and monomers derived from non-renewable (e.g., petroleum) resources. For example, the thermoplastic resin may comprise polymers made from bio-derived monomers in whole, or comprise polymers partly made from bio-derived monomers and partly made from petroleum-derived monomers.

The thermoplastic resin can have a relatively narrow weight distribution, e.g., metallocene PE polymerized by using metallocene catalysts. These materials can improve glossiness, and thus in the metallocene thermoplastic execution, the formed article has further improved glossiness. Metallocene thermoplastic materials can, however, be more expensive than commodity materials.

The preform 10 can be formed by any known or developed method. For example, the preform 10 can be formed by extrusion, injection, co-injection and/or over-molding as well as less conventional techniques like compression molding, 3D printing or the like. The preform 10 may be formed such that at least a portion of the preform walls 30 includes some texture, e.g. lines, dots, a pattern, and/or indicia, or they may be formed to be smooth. Some of the limitations related to texturing the preform 10 by means of the preform mold can be avoided by the method described herein and/or by 3D printing of the preform.

Figure 3:
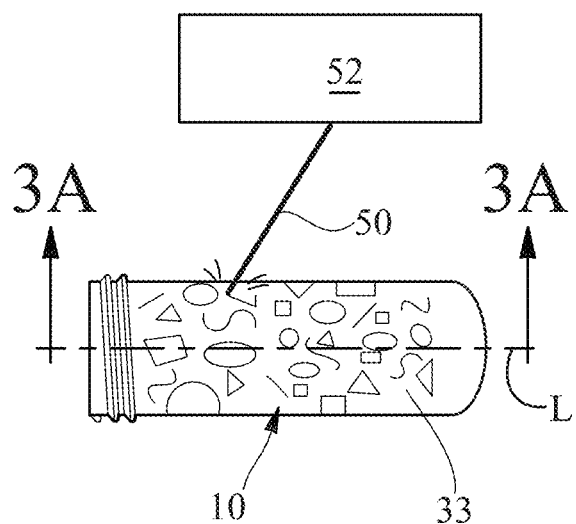
FIG. 3 is a plan view of a preform in accordance with the present invention as it is being laser-etched.
Figure 3A:
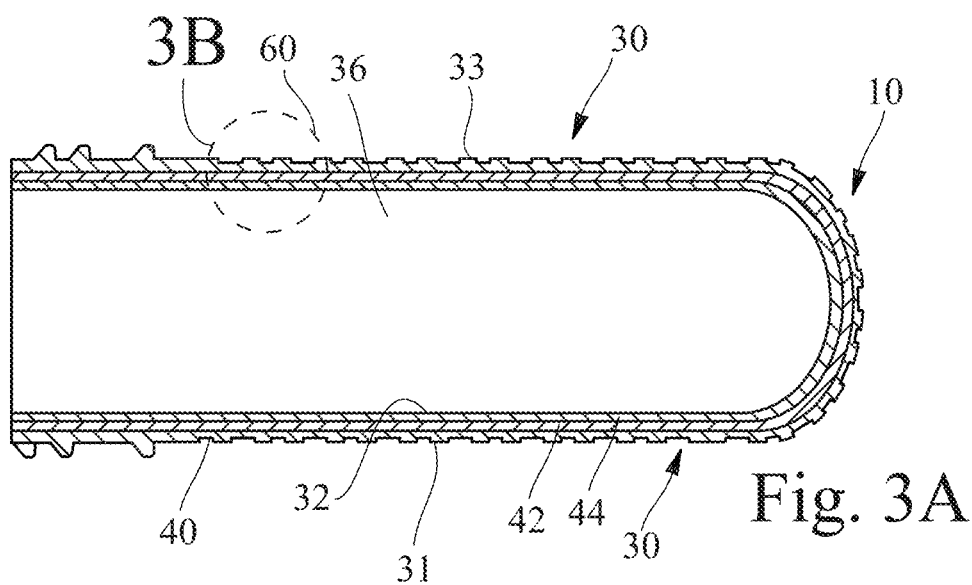
FIG. 3A is a cross-sectional view of the preform of FIG. 3 taken through cross-section line 3A-3A.

The preform 10 may be formed with one or more protuberances 31 or cavities 320 (as shown in FIG. 3A) on at least a portion of the outer surface 33 of the preform wall 30. Such protuberances 31 and/or cavities 320 may be formed on the outer surface 33 when the preform 10 is originally formed (e.g. in the preform mold), or may be formed at a later time or in a different process. Examples of ways to create protuberances 31 or cavities 320 on the outer surface 33 of the preform 10 after it is formed include, but are not limited to etching, including but not limited to laser-etching, mechanical etching, thermal etching and chemical etching; water jets; cold pressing; hot pressing; milling; etc. The protuberances 31 and/or cavities 320 may also be formed by adding material to the outer surface 33 of the preform 10 during or after the preform molding process. The protuberances 31 and/or cavities 320 may take on any desired shape and may be in the form of a random or predetermined pattern including lines, dots, curves, letters, numbers, and/or indicia on the outer surface 33.

FIG. 3 shows an exemplary embodiment of a preform 10 that is being laser-etched by the beam 50 of laser 52, although any other suitable technique may be employed. The laser beam 50 removes a portion of the material forming the outer surface 33 of the preform 10 resulting in the protuberances 31 on the outer surface 33. One advantage of using post-formation modification of the outer surface 33 of the preform 10 is that there are few, if any, limitations with respect to the particular pattern that can be chosen for the protuberances. Further, using laser-etching or other easily modified etching methods can also allow for different preforms 10 from the same mold to have different patterns of protuberances 31 and/or cavities 320 which can significantly reduce the cost of producing articles with different aesthetic features 112 which, in turn, can make production of small numbers of articles and even customized articles economically feasible.

FIG. 3A is cross-sectional view of the preform of FIG. 3 taken through section line 3A-3A of FIG. 3. The exemplary embodiment shown in FIG. 3 has three layers in the preform wall 30. Layer 40 is the outer layer, layer 42 is the intermediate layer and layer 44 is the inner layer. As can be seen, the outer layer 40 includes protuberances 31 and cavities 320. Although the protuberances 31 are shown as being formed from the material of the outer layer 40, it is contemplated that they may be formed from a separate material added to the preform 10 and/or any of the layers making up the preform 10. One way to form the protuberances 31 is to add a material to the outer surface 33 of the preform 10. A way to form cavities 320 is to remove material from one or more of the layers of the preform 10. For example, a laser could be used to form cavities 320 in a layer disposed inwardly of the outer layer 40 in addition to or alternatively to protuberances 31 and/or cavities 320 formed in or on any other layer. Yet another way is to form the protuberances 31 and/or cavities 320 is to do so in the mold when the preform 10 is originally formed.

Figure 3B:
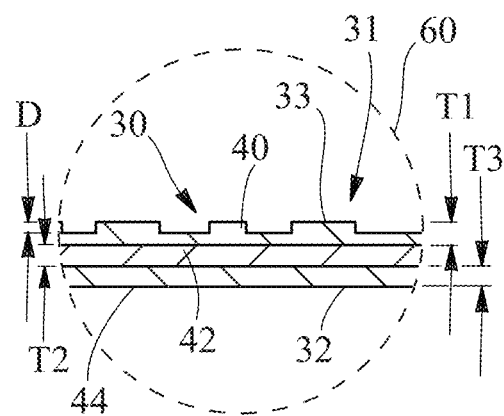
FIG. 3B is an enlarged view of portion 60 of the preform shown in FIG. 3A.

FIG. 3B is an enlarged view of a portion 60 of the preform 10 shown in FIG. 3A. For the purposes of this example, the cavities 320 can be considered to have been made by laser etching. However, this example is not intended to limit the scope of the invention and, as noted above, the protuberances 31 and/or cavities 320 can be formed by any suitable method. In the Figure, the depth D represents the depth of the cavity 320 from the outer surface 33 of the preform 10. If cavities 320 or protuberances are formed by adding material to the outer surface 33 of the preform 10, the depth D is measured from the outer surface 33 to the top of the material added to form the cavity 320 or as the depth of any cavity 320 formed fully within the added material if the cavity 320 does not extend all of the way through the added material to the outer surface 33 of the preform 10.

The depth D can be the same as or different than the thickness of any layer. For example, the depth D of the cavity 320 can be the same as the thickness T1 of the outer layer 40 or can be greater than or less than the thickness T1 the outer layer 40 and/or any other layer (e.g. pre-etching thickness T3 of inner layer 44 or T2 of intermediate layer 42). The depth D of the cavity 320 may be less than the thickness T1 of the outer layer 40 if it is desired that the outer layer 40 form the outer surface 33 of the preform 10. Alternatively, the depth D of the cavity 320 may be greater than the thickness T1 of the outer layer 40 if it is desired for one or more layers other than the outer layer 40 to form a portion of the outer surface 33 of the preform 10. The depth D of the etching and/or cavities 320 can affect the aesthetic and/or textural features on the resulting blow molded article as can different sizes and shapes of the laser beam 50.

Typically, the depth D of the cavities 320 is between about 0.001 mm to about 2 mm, but any suitable depth D can be used. For example, any cavity or portion thereof can be up to about 90% of the thickness of the preform wall 30. A cavity 320 or protuberance 31 can take any desired shape. For example, the shape of the cavity 320 may follow a gaussian curve, where the cavity 320 is wider at the top and narrower at the bottom. A cavity 320 can also be in the shape of a non-tapered slit with generally vertical walls. Still further, the shape of a cavity 320 can follow other geometries like a reverse taper or barrel shaped taper. Even further, the cavity 320 or any portion thereof can have an asymmetric cross-section.

Laser:

As stated above, one method to create predetermined pattern 54, such as a predetermined pattern 54 of cavities 320 on the preform 10 is by laser-etching. Any suitable laser can be used to etch the surface of the preform 10. One example of a laser 52 useful for etching/ablating a preform 10 in accordance with the present invention is a sealed carbon dioxide type laser, having power in the range of 40 W to 2.5 kW, and a laser wavelength of 9 microns to 11 microns, or from 9.4 microns to 10.6 microns. Such lasers are available from various suppliers, including an LPM1000 module, available in 30 LASERSHARP systems from LasX Industries, Inc. of White Bear Lake, Minn., United States. Other makes and types of lasers are also possible and different power ranges and settings may be used. The laser 52 can include optics that can be used to change the energy density and/or spot size of the laser beam, as desired.

Article:

Articles in accordance with the present invention can take on a variety of forms. One form, a blow molded article, such as a bottle, is discussed throughout the specification and shown in the drawings. However, it should be understood that other forms are contemplated, and the scope of the invention should not be considered limited to any particular form or type unless specifically articulated by the relevant claim language.

Figure 4:
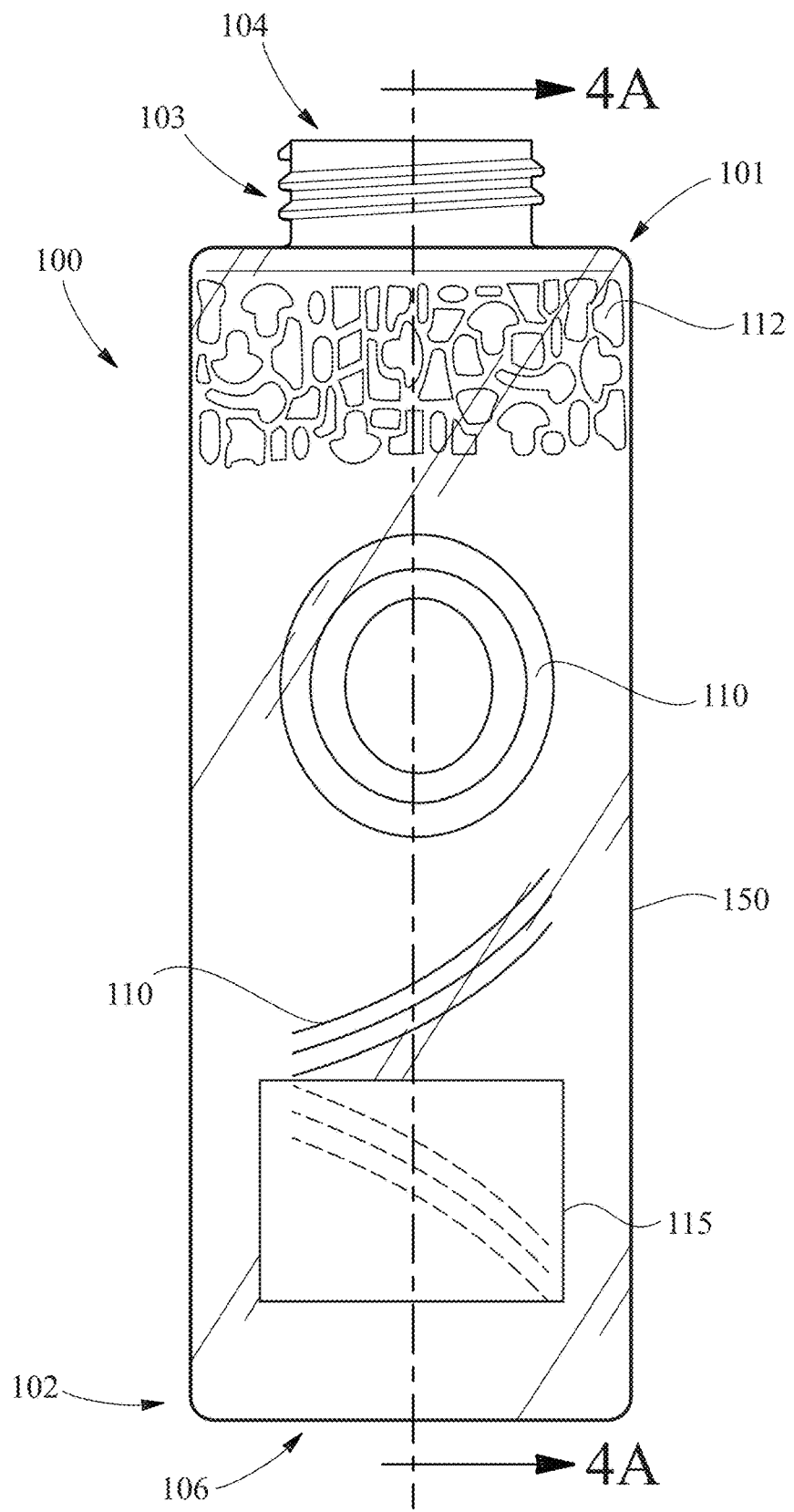
FIG. 4 is a plan view of a blow molded article in accordance with the present invention.
Figure 4A:
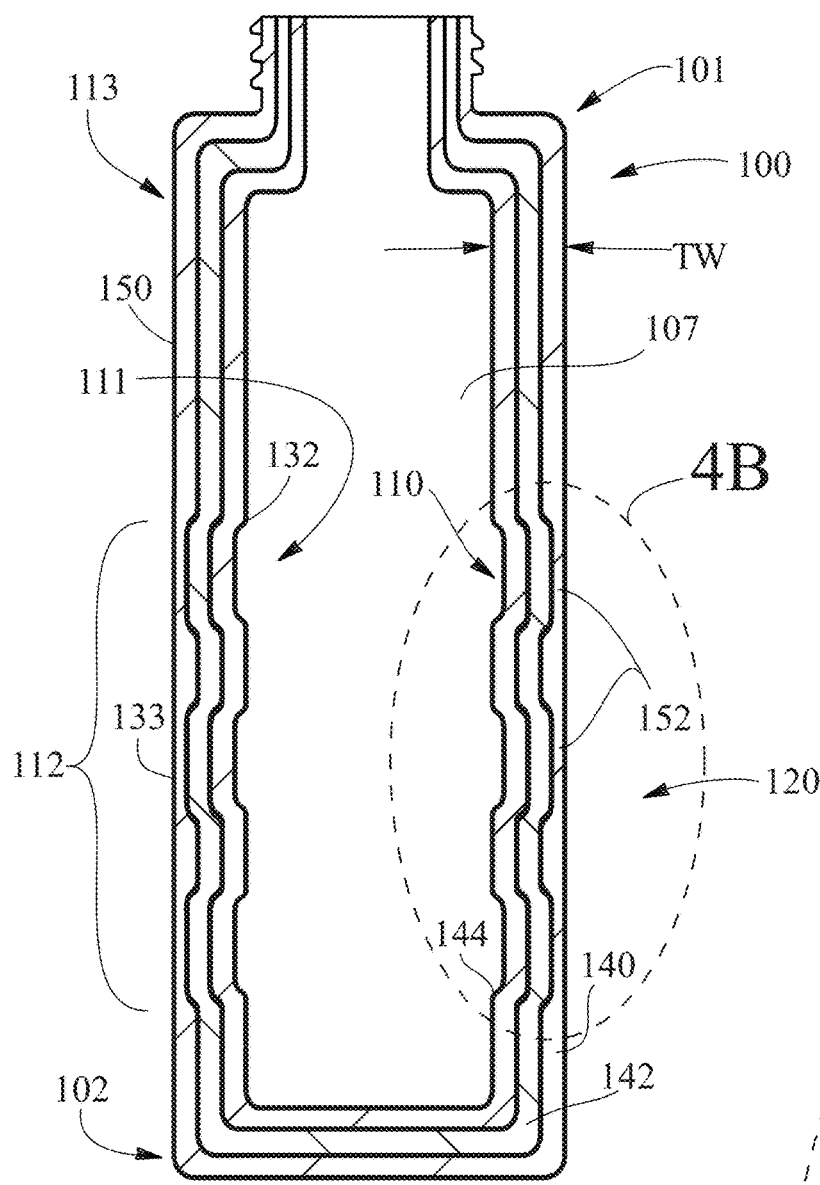
FIG. 4A is cross-sectional view of the preform of FIG. 4 taken through cross-section line 4-4.

Articles 100 in accordance with the present invention may be provided with unique and beneficial characteristics. The characteristics are the result of unique features relating to the structure of the article 100 itself, characteristics of the preform 10, and the method of making the preform 10 and/or article 100. FIGS. 4-6 show examples of blow molded articles 100 in accordance with the present invention. As noted above, the present invention can provide aesthetic and textural features to articles 100 that were heretofore not attainable and/or not attainable with currently available mass production equipment and technology. For example, as shown in FIG. 4, articles 100 of the present invention may include a neck 103 with an opening 104 in fluid communication with an interior space 107 (shown in FIG. 4A), a base 106, a first shoulder 101 adjacent the neck 103, a second shoulder 102 adjacent the base 106 and one or more walls 150 extending between the first shoulder 101 and the second shoulder 102. As shown in FIG. 4A, the article 100 generally has an article inner surface 132, and an article outer surface 133. The article 100 may include a texture 110 on the article inner surface 132 or article outer surface 133 of the article 100. In addition, the outer surface 133 of the article 100 or any other surface may be printed with aesthetics and/or indicia including, but not limited to graphics, colors, words, numbers, symbols, etc. Examples of printing techniques include but are not limited to laser printing, ink jet printing, contact printing, screen printing, lithographic printing, and combinations thereof.

Figure 4B:
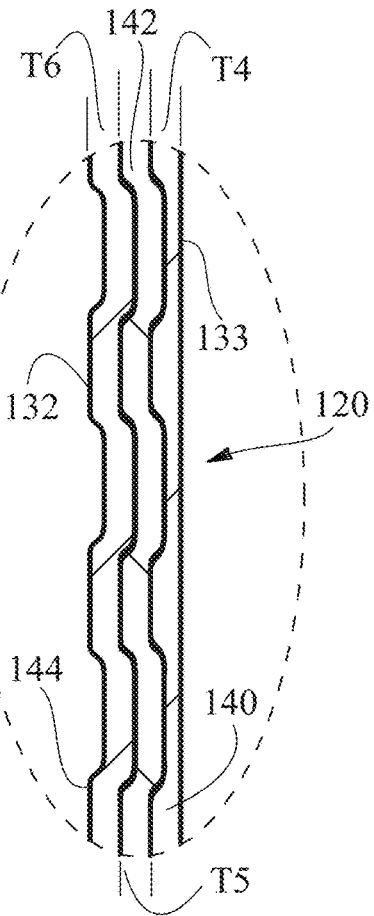
FIG. 4B is an enlarged view of portion 60 of the preform shown in FIG. 3A.

The articles 100 of the present invention may have one or more layers of material making up portions or all of the article 100. In multilayer articles 100, there may be two or more layers. For example, as shown in FIGS. 4A and 4B, article 100 may have a first layer 140 forming the article outside surface 133 of the article 100, a third layer 144 forming an inside surface 132 of the article 100, and a second layer 142 sandwiched between the first layer 140 and the third layer 144, wherein the layers together make up the entire wall 150 of the article 100 in that region. Generally, the multilayer region (i.e. the region comprising more than one layer) makes up a major portion or the entirety of the article 100 wall 150 surface, but embodiments are contemplated wherein at least a portion of the article 100 includes fewer than all of the layers disposed in at least another region of the article 100. For example, one or more of the layers may not extend the entire distance from the neck 103 to the base 106 of the article 100.

The walls 150 of the article 100 can be any suitable thickness. For example, the wall thickness TW (shown in FIG. 4A) may range from about 0.1 mm to about 3.0 mm, although other thicknesses are possible depending on the particular process used and the desired end result. Also, the relative thickness of the layers, if any, can be different from each other and can vary throughout the particular layer. That is each of the layers may have a thickness that is different from the other layers or some or all may have thicknesses that are approximately the same. Generally, each layer is somewhere between 5% and 100%, 5% and 75%, 5% and 50%, or 5% and 40% of the total thickness of the article wall. And, as noted above, different portions of the walls 150 and/or layers may have different thicknesses, as desired.

One or more of the layers or portions of any layer in the article 100 may be transparent, translucent or opaque. Likewise, one or more of the layers or portions thereof may include one or more pigments or other color-producing material. In such instances, one or more of the layers may be visible through one or more of the other layers. The presence of a smooth transparent outside layer can help allow for pigments in other layers to be visible from outside of the article 100 and can at the same time provide the article 100 with gloss. Without being bound by theory, it is believed that the presence of a glossy surface at a distance from a translucent or opaque layer that includes pigments can create an effect of "depth" which can contribute to a premium appearance of the article itself. It can also give the appearance that the article 100 is made from glass or a material other than a thermoplastic material.

As shown in FIGS. 5 and 6, articles 100 in accordance with the present invention may include one or more aesthetic features 112. Examples of aesthetic features include, but are not limited to patterns, indicia, one or more colors, shading, gradation, appearance of depth, as well as other aesthetic features and combinations thereof. Generally, the aesthetic feature(s) 112 of the article 100 are visible by users under ordinary use conditions. However, embodiments are contemplated wherein the aesthetic feature(s) 112 or portions of the aesthetic feature(s) 112 are visible only under certain circumstances, such as when the article 100 is filled with a product or material, partially filled or when the article 100 is empty or partially empty.

One benefit of the present invention is that it allows aesthetic and/or textural features to be added to blow molded articles, for example injection blow molded (IBM) articles, injection stretch blow molded (ISBM) articles, and extrusion blow molded articles (EMB) that could not otherwise be achieved. This is important because such IBM and ISBM can be made from PET, which is often preferred over other materials because PET is more universally recycled than other clear and glossy thermoplastic materials. The present invention allows for IBM and ISBM articles to be made that have smooth outer surfaces and yet have and aesthetic elements that appear to have depth, texture and/or dimension (e.g. 3D). Although EBM articles can be provided with certain textured surfaces, due to the nature of the extrusion blow molding process (typically using PETG), the range of textures, and thus, aesthetics, is limited. Also, the resulting products tend to be less easily recycled than IBM and ISBM articles containing only PET. The "G" in PETG refers to glycol modified PET copolymer in which some of the ethylene glycol is replaced with a second glycol, cyclohexane dimethanol (CHDM) and it is generally considered a contaminant in recycling streams and can negatively impact the performance and processability of PET. Thus, improvements in the aesthetic features of IBM and ISBM articles is highly desirable.

One especially advantageous and unique aspect of the present invention is that it allows for articles 100 to be formed with a visual impression of depth, texture and/or dimension on the article outer surface 133 of the article 100, even where the article outer surface 133 or portions thereof are smooth relative to the texture or visual impression of texture. Referring back to FIG. 4, a relatively smooth article outer surface 133 with a texture-like appearance may be, for example, achieved when a texture 110 is formed on the inner surface 132 of the article 100, and at least a portion of the one or more layers of the wall 150 of the article 100 is/are transparent or translucent. A smooth article outer surface 133 can be advantageous, for example, when applying a label 115 to a portion of the article outer surface 133 of the article 100, especially when the label 115 is intended to adhere to the article outer surface 133, such as, for example, pressure sensitive labels, shrink labels, direct object printing, wrap around labels, screen printing, in-mold labels, transfer labels, pad printing and any other labels, printing or materials placed on or adjacent the outer surface 133. A smooth article outer surface 133 can also be desirable when the article outer surface 133 is to be printed, when a shrink label is used, and/or for other reasons, including "feel", processing, look, etc.

As shown in FIGS. 4A and 4B, the article 100 may have an aesthetic feature 112 such as texture 110 disposed on a portion 120 of the article 100. The texture 110 may create all or a portion of an aesthetic feature 112, as set forth herein. In the example shown, the texture 110 is disposed on the inner surface 132 of the article, but embodiments are contemplated wherein the texture 110 is disposed on the article outer surface 133 and or both the article inner surface 132 and the article outer surface 133. The texture 110 is shown as being created by variations in the thickness T6 of the inner layer 144 of the article. The texture 110 is the result of the etching done to the preform 10 that was used to form the article 100 and the blow molding process itself.

The aesthetic feature 112 results from the preform 10 from which the article 100 is made being manipulated prior to expanding the article 100 to its final shape. The aesthetic feature 112 may include etched regions 111 and non-etched regions 113. The etched regions 111 correspond to the areas of the article 100 that were etched when the article was a preform 10 and not yet expanded to its final shape. The non-etched regions 113 are regions or the article 100 that correspond to regions of the preform 10 that were not etched prior to being expanded into the final article 100. The etched regions 111 may be flush with or extend inwardly or outwardly from the non-etched regions 113 of the outer surface 133 of the article 133. It may be desirable that if the etched regions 111 extend inwardly or outwardly from the non-etched regions 113, they do so no more than a pre-determined amount to provide the outer surface 133 with a particular topography. For example, limiting the inward or outward extension of the etched regions 111 can help provide an outer surface 133 that is smooth to the touch and/or can readily accept printing and/or a label, or other form of decoration.

As shown in FIG. 4B, the article 100 may have a first layer 140 having a first thickness T4, a second layer 142 having a second thickness T5, and a third layer 144 having a third thickness T6. The first layer 140 is disposed outwardly of the third layer 144. The first layer 140 includes thinned regions 152 that are thinner than the thickness T4 of the first layer 140 outside of the thinned regions 152. The thinned region 152 of the first thickness T4 may be less thick than at least a portion of the second thickness T5 and/or third thickness T6 overlying the thinned regions T4. Thus, the aesthetic feature 112 may be created by variations in the thickness of one or more of the layers of the article 100 in a predetermined pattern. As shown in FIGS. 4A and 4B, the first thickness T4 of the article 100 may vary more than the second thickness T5 of the second layer 142 and/or the third thickness T6 of the third layer 144 through at least a portion of the aesthetic feature 112.

Figure 4C:
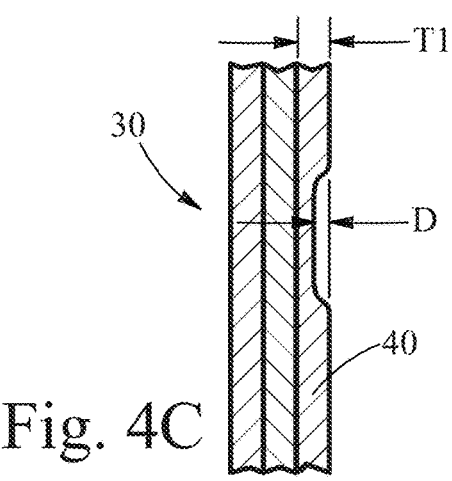
FIG. 4C is an enlarged view of portion of a preform in accordance with the present invention.
Figure 4D:
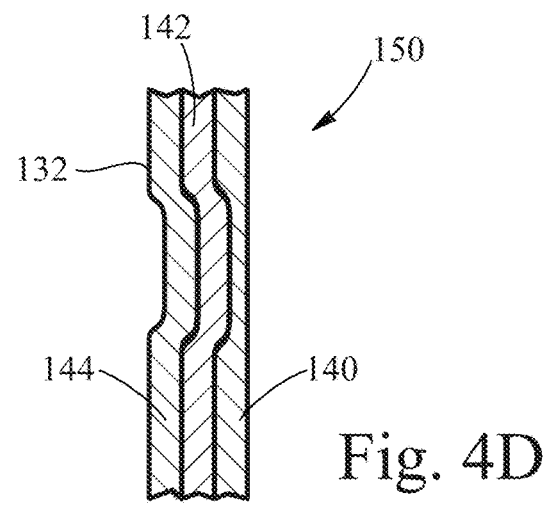
FIG. 4D is an enlarged view of portion of a blow molded article in accordance with the present invention.
Figure 4E:
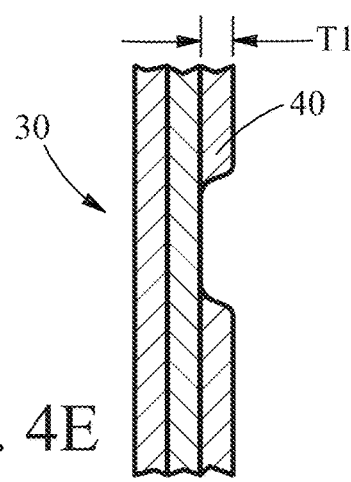
FIG. 4E is an enlarged view of portion of a preform in accordance with the present invention.
Figure 4F:
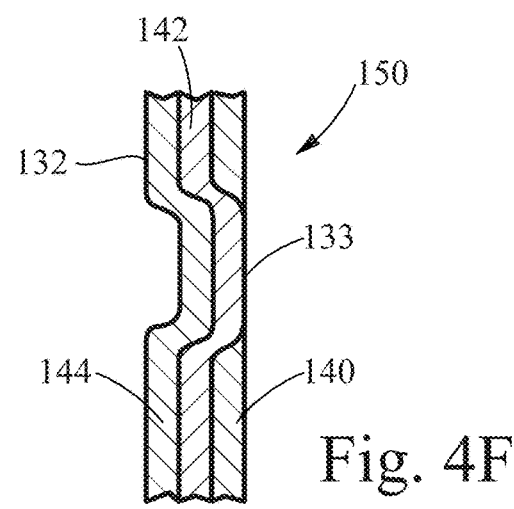
FIG. 4F is an enlarged view of portion of a blow molded article in accordance with the present invention.
Figure 4G:
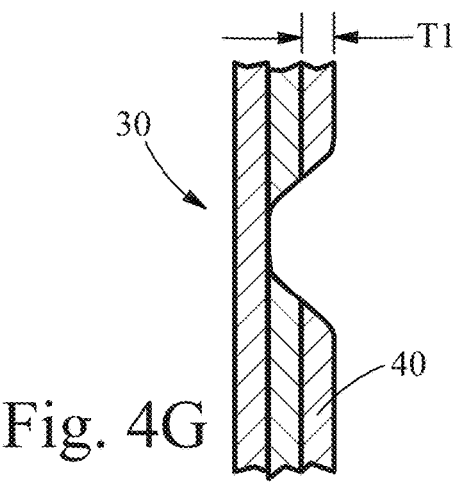
FIG. 4G is an enlarged view of portion of a preform in accordance with the present invention.
Figure 4H:
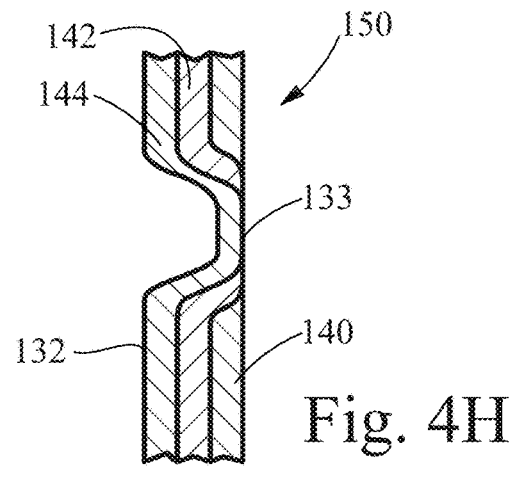
FIG. 4H is an enlarged view of portion of a blow molded article in accordance with the present invention.

FIGS. 4C-H show different examples of how the wall 150 of an article 100 may look due to different etching depths made to the preform 10. FIG. 4C shows the wall 30 of a preform 10 wherein the depth D of the etching is less than the thickness T1 of the outer layer 40. FIG. 4D shows how the wall 150 of an article formed from the preform 10 of FIG. 4C might look after the article 100 is formed. As shown, the portion of the wall 150 shown includes three layers, a first layer 140, a second layer 142 disposed inwardly of the first layer 140 and a third layer 144 that is disposed inwardly of the second layer 142. The first layer 140 has a portion corresponding to the etching of the preform 10 that is thinner than the non-etched portion of the wall 150. FIG. 4E shows the wall 30 of a preform 10 wherein the depth D of the etching is equal to the thickness T1 of the outer layer 40. FIG. 4F shows how the wall 150 of an article formed from the preform 10 of FIG. 4E might look after the article 100 is formed. As shown, the wall 150 includes three layers, but the first layer 140 has a portion missing corresponding to the etching of the preform 10. Thus, at least a portion of the outer surface 133 of the article 100 is formed by the second layer 142. FIG. 4G shows the wall 30 of a preform 10 wherein the depth D of the etching is greater than the thickness T1 of the outer layer 40. FIG. 4H shows how the wall 150 of an article formed from the preform 10 of FIG. 4C might look after the article 100 is formed. As shown, the wall 150 includes three layers, but the article outer surface 133 has a portion corresponding to the etching of the preform 10 that is made up of the third layer 144. An article 100 can be formed from any number of layers and can include any number of textural, functional and/or aesthetic features 112 that have characteristics, e.g. different layers visible and/or forming the outer surface 133 of the article 100.

FIGS. 5 and 6 are examples of bottles in accordance with the present invention. FIG. 5 shows an article 100, such as a bottle, with an aesthetic feature 112 visible on the article outer surface 133. The article has three layers of material forming the wall 150 of the article 100. The outer layer of the article 100 is a different color than the middle layer. The unique aesthetic feature 112 can be at least partially attributed to the fact that a portion of an inner layer of the article 100 is visible through the outer layer. The aesthetic pattern 112 is formed by laser-etching the preform used to make the article 100. Specifically, the outer layer of the preform is laser-etched in a predetermined pattern 54 and at a predetermined depth to allow the color of the middle layer of the article 100 to be visible through the outer layer. In the embodiment shown, the first layer 140 includes a material that provides a gloss surface. The article outer surface 133 is generally smooth despite the visual impression of texture provided by the aesthetic feature 112.

The extent to which a particular surface is smooth can be expressed in terms of various different surface topography measurements. Two measurements that have been found to be particularly helpful in characterizing the surface topography of preforms and articles in accordance with the present invention are Maximum Peak/Pit Height (Sz) and Root Mean Square Roughness (Sq) as described below in the Measurement Methods section of this specification. For example, it may be desirable to limit the Maximum Peak/Pit Height across some or all of the article outer surface 133 and/or the Root Mean Surface Roughness the to provide a surface that is desirable for printing, and/or labeling, or for other tactile, aesthetic or functional reasons. For example, it may be desirable for the Sz of some or all of the article outer surface 133 to be less than or equal to 750 microns, 500 microns, 250 microns, 200 microns, 150 microns, 100 microns, or 50 microns. Additionally, or alternatively, it may be desirable for some or all of the etched regions 111 to have an Sq of a certain value or below. For example, it may be desirable for some or all of the etched regions 111 to have an Sq of less than or equal to 10 microns, 8 microns, 5 microns, or 2 microns. As a result of the process used to form the aesthetic feature 112, such as predetermined pattern 54, the inner surface 132 may have certain topological characteristics as well. For example, some or all of the etched regions 111 of the inner surface 132 may have an Sq of greater than or equal to about 2 microns, 5 microns, 8 microns, or 10 microns and the Sz of some or all of the article inner surface 132 may be greater than or equal to 50 microns, 100 microns, 150 microns, 200 microns, 250 microns, 500 microns, or 750 microns.

FIG. 6 shows an article 100, a bottle, with an aesthetic feature 112 visible on the article outer surface 133. The article has three layers of material forming the wall 150 of the article 100. The outer layer of the article 100 is a different color than the middle layer. The unique aesthetic feature 112 can be at least partially attributed to the fact that a portion of an inner layer of the article 100 is visible through the outer layer. The aesthetic pattern 112 is formed by laser-etching the preform used to make the article 100. Specifically, the outer layer of the preform is laser-etched in a predetermined pattern 54 and at a predetermined depth to allow the color of the middle layer of the article 100 to be visible through the outer layer. In the embodiment shown, the first layer 140 includes a material that provides a gloss surface. The article outer surface 133 is smooth relative to the visual impression of texture provided by the aesthetic feature 112. Specifically, the article outer surface 133 or portion thereof that is smooth, for example, may have an Sq of less than or equal to about 10 microns, 8 microns, 5 microns, or 2 microns. Additionally, or alternatively, the article outer surface 133 may have a topography created by the aesthetic feature 112 having an Sz that is less than or equal to 750 microns, 500 microns, 250 microns, 200 microns, 150 microns, 100 microns, or 50 microns. As a result of the process used to form the aesthetic feature 112, the inner surface 132 may have certain topological characteristics as well. For example, some or all of the etched regions 111 of the inner surface 132 may have an Sq of greater than or equal to about 2 microns, 5 microns, 8 microns, or 10 microns and the Sz of some or all of the article inner surface 132 may be greater than or equal to 50 microns, 100 microns, 150 microns, 200 microns, 250 microns, 500 microns, or 750 microns.

For any multi-layer article 100, the article outer surface 133 may be formed solely by the third layer 144 or may be formed partially by the third layer 144 and at least partially by any other layer. For example, the article 100 may have a wall 150 that has an article outer surface 133 formed mostly by the third layer 144 and partially by another layer. This can be the case when the outer layer 40 of the preform 10 is etched to a depth that an underlying layer is exposed in the final article 100. This can provide the article 100 with unique visual and tactile features as the layers may have different characteristics, such as gloss, translucency, color, feel, etc.

Figure 6A:
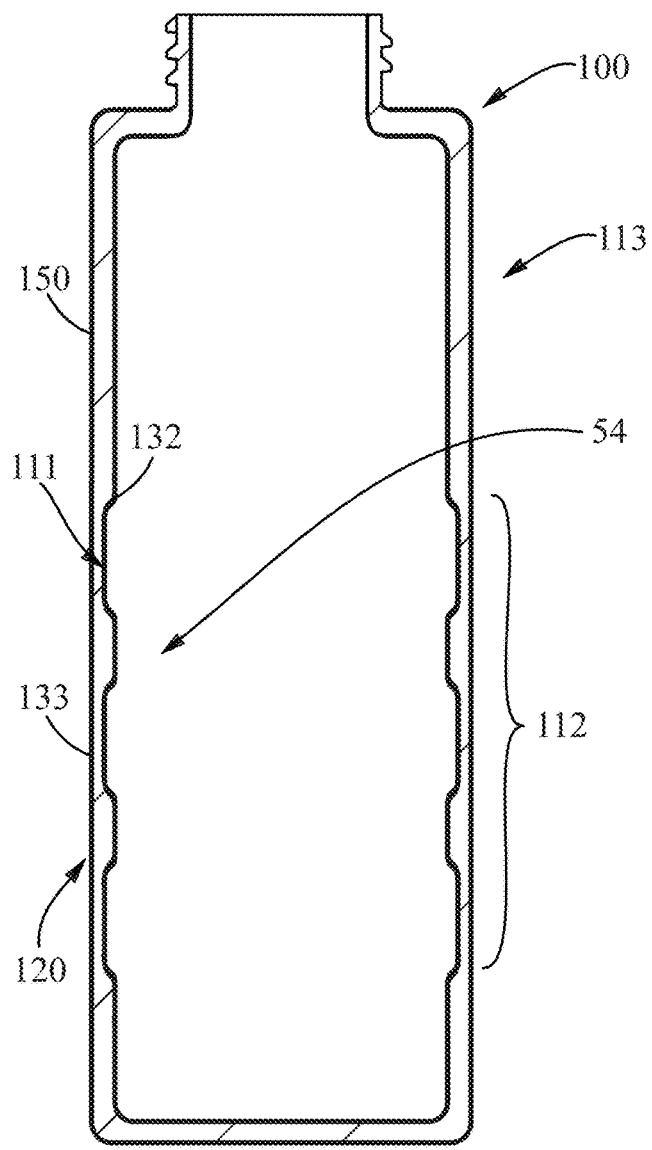
FIG. 6A is a cross-sectional view of a blow molded article in accordance with the present invention.
Figure 6B:
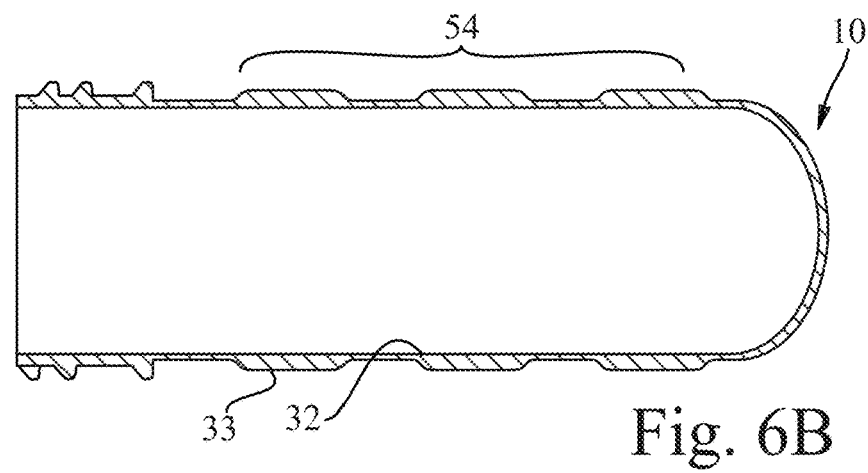
FIG. 6B is a cross-sectional view of a preform for a blow molded article in accordance with the present invention.

Although the above examples are of a multi-layer article, mono-layer blow molded articles are also contemplated. For example, as shown in FIG. 6A, a mono-layered article 100 may be formed from a preform having a thermally-etched predetermined pattern 54. An aesthetic, functional, and/or texture feature may be incorporated into the wall 150 of the article 100 such that it is visible from the exterior of the article 100. The aesthetic feature 112 may be formed from variations in the thickness of the wall 150 corresponding to a predetermined pattern 54. The predetermined pattern 54 may include regions or patterns that were ablated from the outer surface 33 or inner surface 32 of the preform 10 (an example of which is shown in FIG. 6B) used to create the article 100, such as, for example, by laser-etching. The mono-layer, laser-etched, article 100 may have an article outer surface 133 or portion thereof that is smooth, for example, having an Sq of less than or equal to about 10 microns, 8 microns, 5 microns, or 2 microns. Additionally, or alternatively, the article outer surface 133 may have a topography created by the aesthetic feature 112 having an Sz that is less than or equal to 750 microns, 500 microns, 250 microns, 200 microns, 150 microns, 100 microns, or 50 microns. As a result of the process used to form the aesthetic feature 112, the inner surface 132 may have certain topological characteristics as well. For example, some or all of the etched regions 111 of the inner surface 132 may have an Sq of greater than or equal to about 2 microns, 5 microns, 8 microns, or 10 microns and the Sz of some or all of the article inner surface 132 may be greater than or equal to 50 microns, 100 microns, 150 microns, 200 microns, 250 microns, 500 microns, or 750 microns.

Figure 7A:
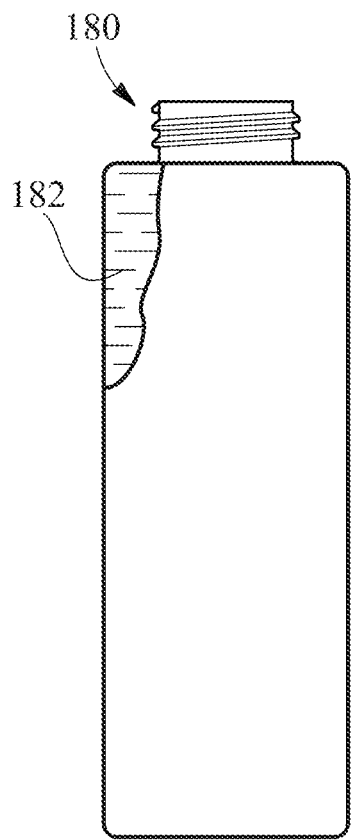
FIG. 7A is a plan view of a blow molded bottle in accordance with the present invention with a portion cut out so that the interior of the bottle can be seen.
Figure 7B:
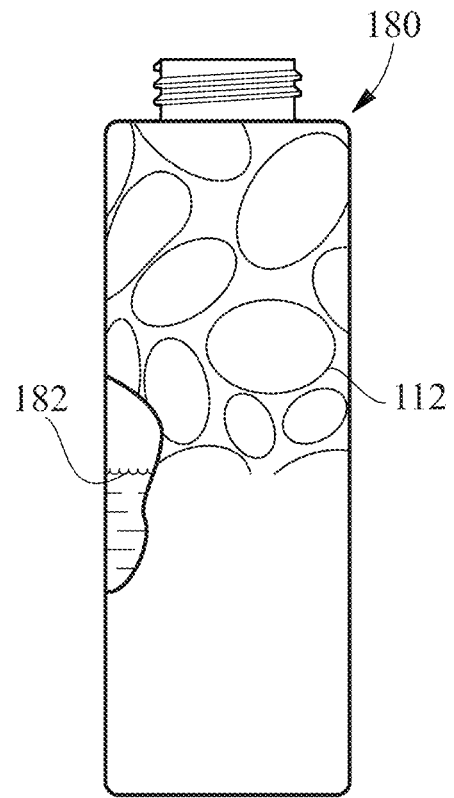
FIG. 7B is a plan view of a blow molded bottle in accordance with the present invention with a portion cut out so that the interior of the bottle can be seen.

The article 100 may be a container or package such as bottle 180 shown in FIGS. 7A and 7B. The bottle 180 may be filled with a composition 182 such as a personal care or home care composition. The bottle 180 may include one or more aesthetic features 112 that are enhanced or mitigated by the presence of the composition 182 in the bottle 180. For example, a composition 182 in a transparent or translucent bottle 180 with a texture 110 on the article inner surface 132 may result in the texture 110 being more, less or even non-apparent where the composition 182 is disposed adjacent the texture 110 than where it is not. In one example, a white composition 182 in a transparent or translucent bottle 180 with texture 110 on the inner surface may obscure the pattern of the texture 110 where the composition 182 is disposed adjacent the texture 110. However, the texture 110 may be clearly visible in regions where the composition 182 is not present, for example, the top portion of the bottle 180 when the bottle 180 is less than half-full of the composition 182. Similarly, other forms of color-matching between the bottle-color and the composition-color (e.g. a blue composition in a blue bottle) may result in the aesthetic feature 112 being more or less-apparent during the time the product is sold or used. Alternately, the aesthetic features 112 of the bottle 180 may be enhanced by the composition 182 therein. For example, choosing different colors for the composition 182 and the bottle 180 may result in the texture or aesthetic features 112 being visually enhanced when the composition 182 is in the bottle 180. Often, colors are described in terms of color-saturation (e.g. L in the L, a, b-scale) and hue, but other color characteristics may also affect the aesthetics of the bottle-composition combination.

The aesthetic feature 112 can be registered with any label 115, pigment, texture, graphic, or any other textural or aesthetic feature of the article 100. For example, it may be desirable to provide the article 100 with a region of visual depth, dimension or texture 110 in a particular location to help enhance another feature of the article 100. To do so, the aesthetic feature 112 can be registered or provided in a pre-determined location such that the aesthetic feature 112 is located in the desired location on the final article 100. Additionally, the present invention can provide the additional benefit of not having to register labels and/or printing with certain areas on the article 100 because the aesthetic feature 112 can be provided while still allowing for a generally smooth outer surface 133. Thus, it may provide a more cost efficient and effective to present articles 100 for labeling or further decoration, etc. than similar articles with rough or uneven outer surfaces.

The predetermined pattern 54 etched into the preform 10 can be designed so as to provide the aesthetic feature 112 on the article 100 after any distortion that may result from the blowing of the preform 10 into the finished article 100. For example, some or all of the features, patterns, indicia and the like comprising a predetermined pattern 54 on the article 100 may be etched on the preform 10 in a pattern that is distorted relative to its desired finished appearance, so that the features, patterns, indicia and the like acquire their desired finished appearance upon being formed into the three-dimensional article 100. Such pre-distortion printing may be useful for indicia such as logos, diagrams, bar-codes, and other images that require precision in order to perform their intended function.

Preforms 10 and articles 100 according to the invention can comprise layers and/or materials in layers with various functionalities. For example, an article 100 may have a barrier material layer or a recycled material layer between an outer thermoplastic layer and an inner thermoplastic layer. The article 100 may comprise, for example, additives typically in an amount of from 0.0001%, 0.001% or 0.01% to about 1%, 5% or 9%, by weight of the article. Non-limiting examples of functional materials include, but are not limited, to titanium dioxide, filler, cure agent, anti-statics, lubricant, UV stabilizer, anti-oxidant, anti-block agent, catalyst stabilizer, colorants, pigments, nucleating agent, and a combination thereof.

Unique Characteristics when Effect Pigments are Used:

The material making up of any one or more of the layers of the preform 10 and article 100 may include one or more effect pigments or other materials such as porogens, including, but not limited to the microdomain-forming liquids, microdomain-forming solids, microvoid-forming solids, and blowing agents described herein. As used herein the term "porogen" refers to a material which may cause gas-filled or vapor-filled microdomains or micropores to occur in a polymer matrix. Examples of porogens include porous solid particles which retain at least some of their porosity during processing to form a container. Other porogens include solid particles which at least partially separate from the matrix upon stretching of a thermoplastic material, resulting in micropore formation. Examples of such solid particles include calcium carbonate particles which may be coated with a fatty acid or salt(s) thereof. Porogens also include blowing agents which may vaporize or evolve gas to form micropores. Such materials may be added to provide a number of different visual effects in the preform 10 or finished article 100, such as, for example, pearlescence, sparkle, reflection, color change, etc. Surprisingly, however, as described in more detail herein, it has been found that when combined with etching, texturing or otherwise modifying the outer surface 33 of the preform 10, the inclusion of effect pigments and/or porogens can provide unique and previously unattainable aesthetic characteristics in the final article 100. For example, the article 100 can be provided with unique aesthetic features having the appearance of depth, texture, and/or three-dimensions. And, except for the novel features and methods described herein, these aesthetic characteristics can be provided with conventional blow molding equipment and techniques. Further, these unique aesthetics characteristics can be provided in articles 100 with smooth, relatively smooth, or substantially smooth outer surfaces 133, which can be a benefit in and of itself. Having a smooth, relatively smooth, or substantially smooth outer surface 133 may be desirable for many reasons, including because it can allow for easier printing of the outer surface 133, easier labeling, easier handling, better tactile feel, and other benefits.

The preform 10 may comprise from about 0.01%, to about 5.0%, preferably from about 0.05% to about 1.5%, and more preferably from about 0.1% to about 0.5%, of a microdomain-forming liquid. Without being bound by theory, the liquid is believed to be finely dispersed in the thermoplastic material due to the high shear conditions during compounding of the masterbatch and/or injection molding of the pre-form. Because the liquid is immiscible with the thermoplastic resin, it forms finely dispersed droplets or phase-separated microdomains within the thermoplastic material. To minimize interfacial energy, the microdomains tend to be spherical in shape when formed. However, during the injection and blow molding processes, the microdomains may change shape. If the thermoplastic material undergoes uniaxial shear or stretch in a particular zone or region, the microdomains may become rod-like, sausage-shaped or ellipsoidal in that region or zone. If the thermoplastic material undergoes biaxial stretch in a particular zone or region, then the microdomains may become disc-shaped or plate-like in that region or zone. These and different shapes may be formed depending on the nature of the extension or stretching of the thermoplastic material. Different fluid-containing microdomain shapes may be disposed in different regions or zones within the preform 10 or article 100.

Microdomain-forming liquids may comprise silicone oils, hydrocarbon oils, liquid polyfluorinated compounds, liquid oligomers, polyalkylene oxides, ethylene glycol, propylene glycol water, ionic liquids, and mixtures thereof. Some or all of the molecules of the microdomain forming liquid may be linear, cyclic or branched. Some or all of the molecules of the microdomain-forming liquid may contain functional groups. Examples of such functional groups include ester, ether, amine, phenyl, hydroxyl, carboxylic acid, vinyl, and halogen groups. A molecule may contain one or more functional groups and a microdomain-forming liquid may comprise molecules with different functional groups. Specific examples of microdomain-forming liquids include linear, branched and cyclic polydimethyl siloxane or other polydialkyl or polydiaryl siloxanes. Suitable siloxane liquids include linear or branched polydimethylsiloxane homopolymers. Hydrocarbon oils include mineral oils (C15-C40) or liquid paraffins. Polyfluorinated compounds include perfluorocarbon compounds such as perflouorooctane as well as fluoropolyethers such as Fomblin® oil. Liquid oligomers include low molecular weight hydrocarbon compounds such as polyisoprene or polyisobutylene. Other liquid oligomers include polyalkylene glycols such as low molecular weight polyethylene glycol. An example thermoplastic material is polyethylene terephthalate (PET), and an exemplary microdomain-forming liquid is hydroxyl-terminated polydimethylsiloxane.

The preform 10 may comprise from about 0.10%, to about 20%, preferably from about 1.0% to about 10%, and more preferably from about 1.0% to about 5.0%, of a microdomain-forming solid material or microvoid-forming solid material. The material is dispersed within a thermoplastic material in the form of small solid particles, the particles typically having a number-average largest dimension of about 1 micron or less. The particles may comprise inorganic material such as calcium carbonate, or organic material such as poly (methyl methacrylate). Without being bound by theory, the microvoid-forming solid particles are believed to be finely dispersed in the thermoplastic material due to the high shear conditions during compounding of the masterbatch and/or injection molding of the pre-form. The solid material may melt during compounding of the materbatch to form liquid droplets, but re-solidifies upon cooling to 25° C. to form phase-separated finely-dispersed solid particles within the thermoplastic material.

It is believed that microvoid-forming solids, upon stretching of the thermoplastic material, e.g. during the blow molding process, at least partially detach from the thermoplastic material matrix to form discrete microvoids within the thermoplastic material. A microvoid, as used herein, can encompass both the gas-filled microvoid and any solid microvoid-forming particle(s) therein. The microvoid-forming solid particles may be treated or coated to facilitate detachment from the thermoplastic polymer matrix upon stretching. For example, the particles may be at least partially coated with a relatively thin layer of a fatty acid or salt thereof such as stearic acid or calcium stearate. Examples of other treatments or coating materials include fluoro compounds and silicone compounds. Examples of inorganic microvoid-forming solid particles include calcium carbonate, silica (including ground, precipitated and/or fumed silica), alumina, titania, clays, barium sulfate, and the like, and mixtures thereof. Examples of organic or organosilicon microvoid-forming solid particles include polysiloxane waxes, hydrocarbon waxes, polyalkylene oxide waxes, polystyrene, polyesters such as polycarbonate, polyolefins, poly (meth) acrylates, polymethylpentene, liquid crystalline polymer (LCP), and other solid or waxy polymers, and mixtures thereof. An exemplary embodiment includes a microvoid-forming solid is calcium carbonate in a polyethylene terephthalate (PET).

Microdomain-forming solids, different than microvoid-forming solids, are believed to soften during the blow molding process. As such, they tend not to detach from thermoplastic polymer matrix in which they are imbedded and do not create microvoids. Examples of microdomain-forming solids include, but are not limited to elastomers and other cross-linked polymers and PET.

The preform 10 may comprise from about 0.01%, to about 5.0%, preferably from about 0.05% to about 1.5%, and more preferably from about 0.1% to about 0.5%, of a microvoid-forming blowing agent. Blowing agents may be solid or liquid under ambient conditions. Without being bound by theory, blowing agents are believed to become finely dispersed or dissolved in the thermoplastic material due to the high pressure and high shear conditions during compounding of the masterbatch and/or injection molding of the pre-form. Blowing agents may be miscible or immiscible with the thermoplastic resin. Upon a triggering event such as heating, pressure reduction, or change in pH, the blowing agent evolves vapor or gas to form a microvoid within the thermoplastic material matrix. The microvoids tend to be spherical in shape when formed. However, during the blow molding process, the microvoids may change shape. If the thermoplastic material undergoes uniaxial stretch in a particular zone or region, the microvoids may become rod-like, sausage-shaped or ellipsoidal in that region or zone. If the thermoplastic material undergoes biaxial stretch in a particular zone or region, the microvoids may become disc-shaped or plate-like in that region or zone. Different shapes may be formed depending on the nature of the extension or stretching of the thermoplastic material and a preform 10 or article 100 may have different fluid-containing microvoid shapes in different regions or zones.

Blowing agents may comprise compounds such as pentane or hexane which are volatile liquids under ambient conditions, but which boil or vaporize under process conditions which may include increased temperature and/or reduced pressure. Alternatively, bowing agents may be solids under ambient conditions but evolve vapor or gas when heated or subjected to other triggering events. Examples of such materials include pentane, sodium bicarbonate, azo compounds such as azobisisobutyronitrile, peroxy compounds such as dibenzoyl peroxide, and the like.

Figure 8:
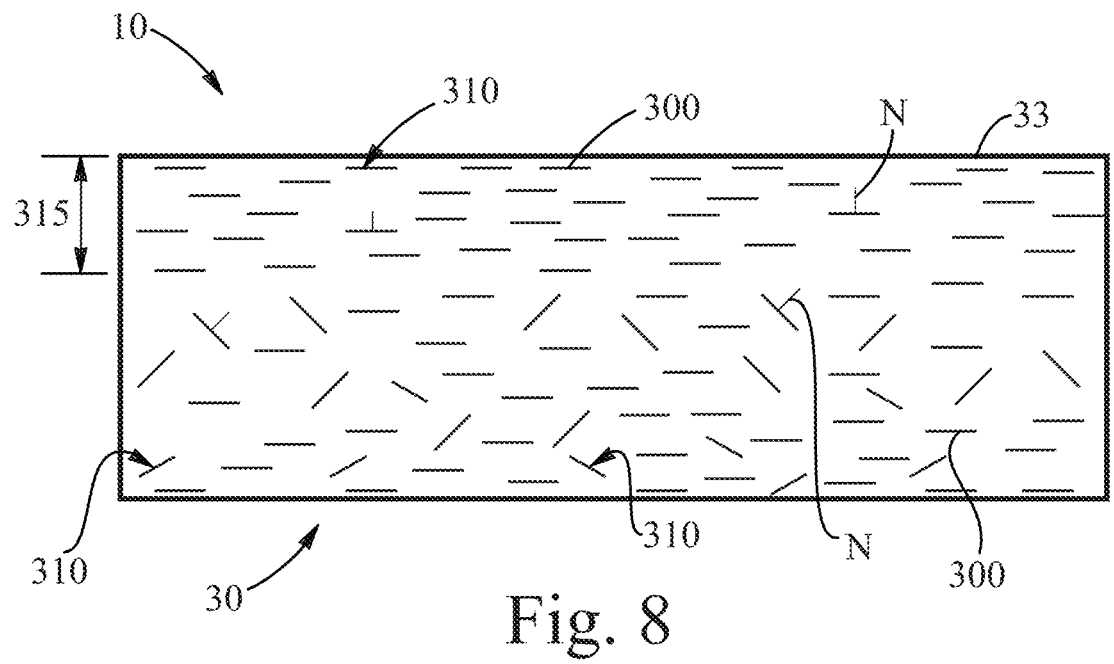
FIG. 8 is an enlarged partial cross-sectional view of a wall of a preform in accordance with the present invention.

The effect pigment, microdomain-forming material, microvoid-forming solid and microvoid-forming blowing agent may include or form platelet-like shaped particles or regions (hereinafter "effect structures") in one or more of the layers of the preform 10. FIG. 8 shows a partial cross-section of a preform wall 30 wherein the material making up the wall 30 includes a multiplicity of effect structures 300. The effect structures 300, as shown in FIG. 8, each have an effect surface 310, which is the most prominent generally planar surface of the effect structure 300. Each effect surface 310 has a "normal" N which represents an imaginary line that is perpendicular to the effect surface 310. The normal N of any particular effect structure 300 can be calculated as set forth in the Measurements Methods section, below.

As can be seen in FIG. 8, the effect surfaces 310 of the effect structures 300 may be aligned generally parallel to the outer surface 33 of the preform 10 at least adjacent the outer surface 33. Accordingly, the orientation of the normal N of the effect surfaces 310 is generally perpendicular to the outer surface 33 of the preform 10 at least in a skin region 315 adjacent the outer surface 33. This alignment is typical when the preform 10 is formed by extrusion or extrusion molding wherein the orientation of the effect structures 300 has not been otherwise altered.

Figure 9:
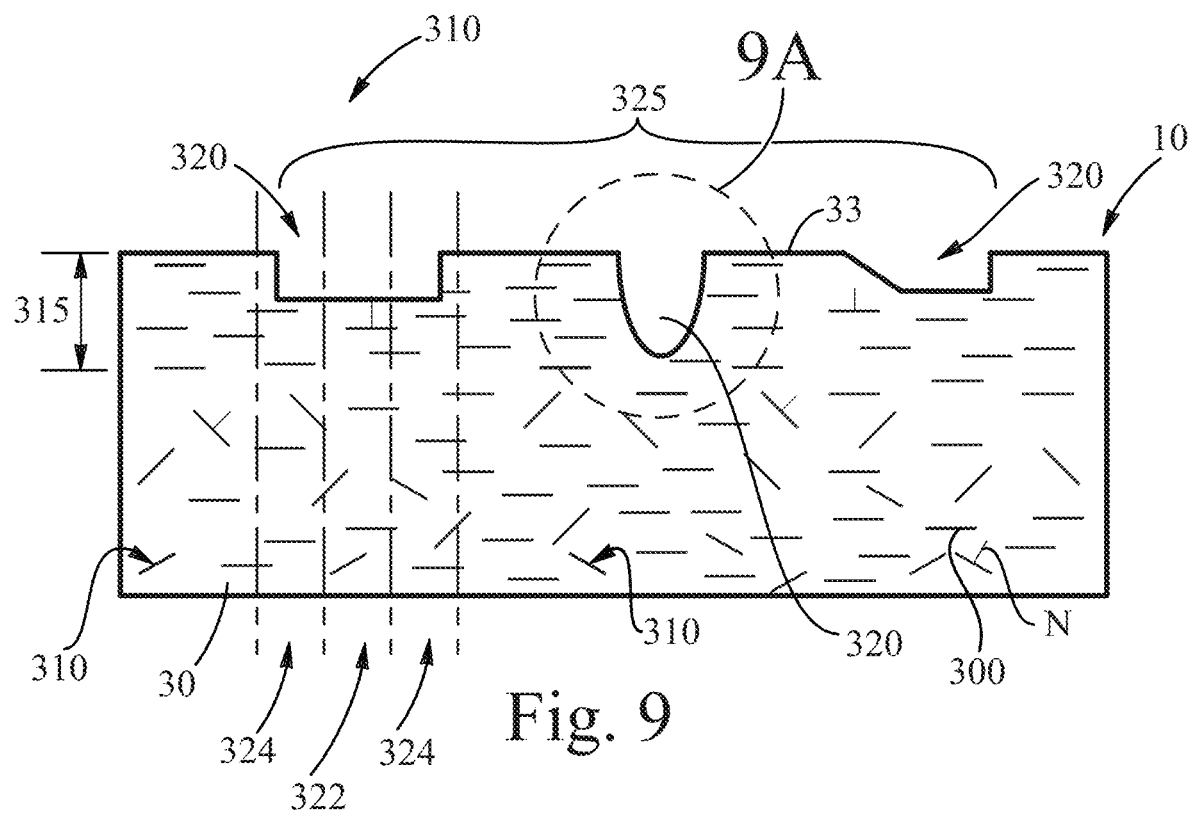
FIG. 9 is an enlarged partial cross-sectional view of the wall of a preform shown in FIG. 8 shown with cavities therein.

FIG. 9 shows how the outer surface 33 of the preform 10 may be manipulated, for example, by laser etching or other means, to form one or more cavities 320 in the outer surface 33 of the preform 10. The cavity 320 or cavities 320 may form a three-dimensional pattern 325 on the outer surface 33 of the preform 10. Also, as shown, the effect structures 300 that remain after the manipulation of the preform generally tend to remain oriented as they were prior to the manipulation.

Figure 9A:
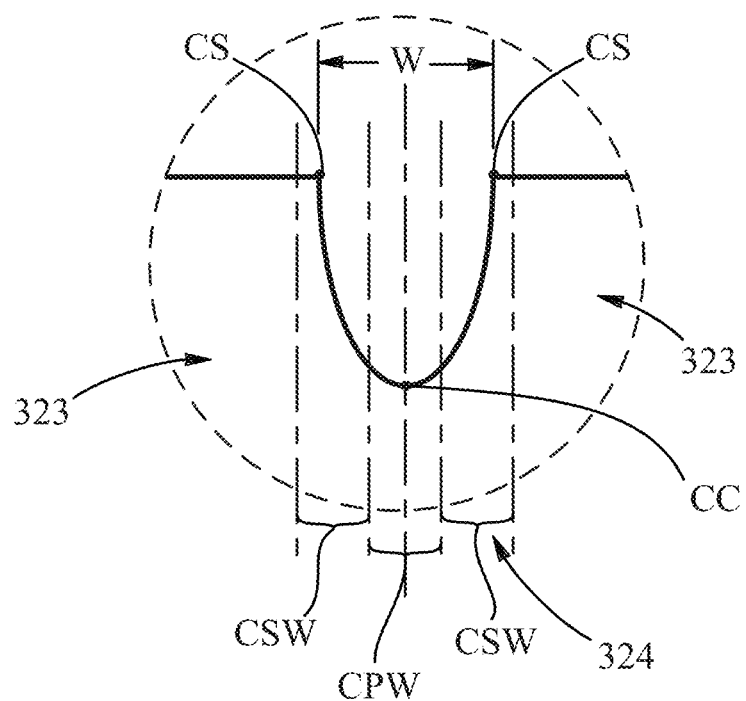
FIG. 9A is an enlarged partial cross-sectional view of portion 9A of FIG. 9.

As shown in FIG. 9A, each cavity 320 has a width W, a cavity length (not shown), a cavity center CC, and at two opposed cavity sides CS. The cavity length is the longest dimension of the cavity 320 and the cavity width W is the shorter dimension of the cavity 320 generally perpendicular to the cavity length. If the cavity 320 has no perpendicular dimensions that are different from each other, then the cavity width W should be taken as the shortest dimension in the particular region being evaluated and the cavity length is perpendicular to the cavity width W. The cavity center CC is located at the center of the cavity in the width W dimension (i.e. equidistant between the cavity sides CS). Each cavity 320 has a cavity central portion 322 centered around the cavity center CC. The cavity central portion 322 has a central portion width CPW that is ½ the width of the cavity. Each cavity 320 also includes two cavity side portions 324 disposed on opposite sides of the cavity central portion 322. The cavity side portions 324 have a side portion width SPW that is equal to the central portion width CPW and extend outwardly from the central portion 322 beyond the cavity sides CS. Extending outwardly (away from the cavity center CC) from each cavity side portion 324 is a non-cavity portion 323 that has a non-cavity portion width NPW that is the same as the central portion width CPW and the side portion widths SPW.

Figure 10:
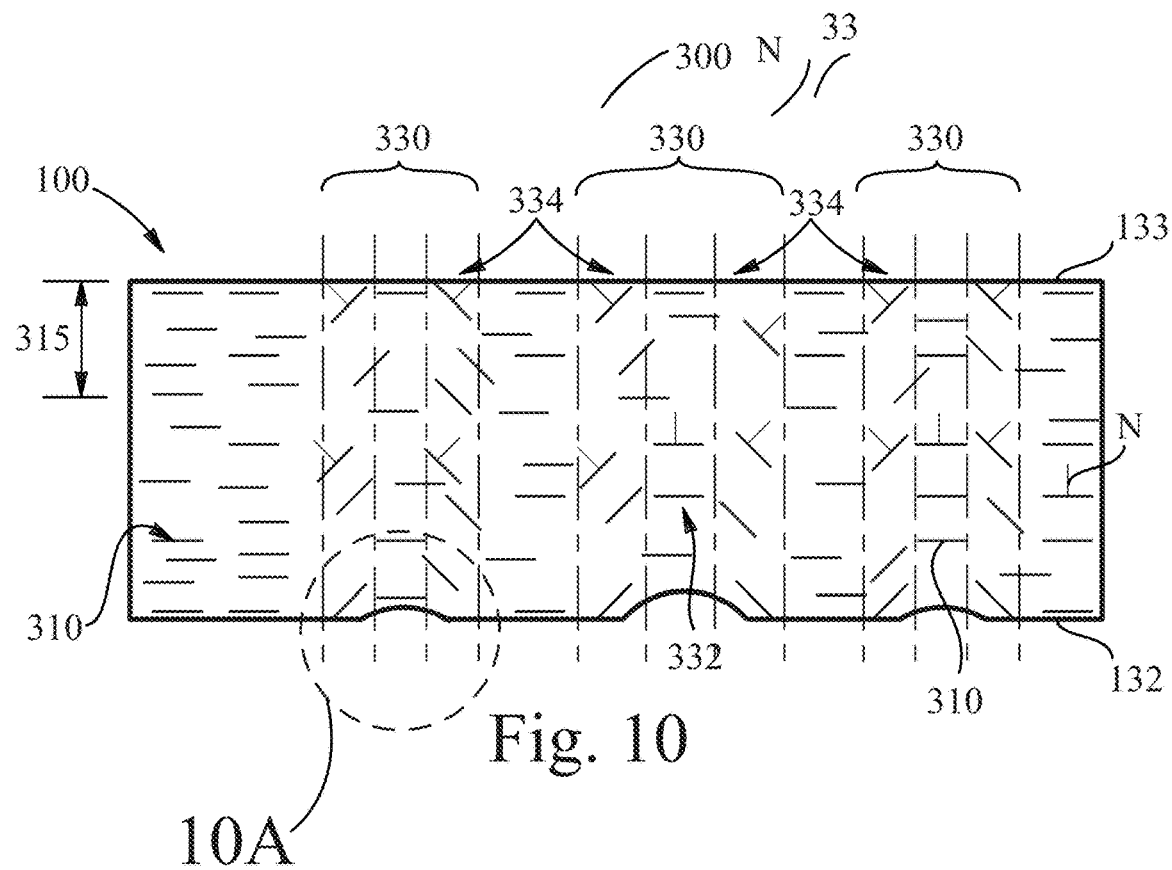
FIG. 10 is an enlarged partial cross-sectional view of a wall of a blow molded article made from the preform shown in FIG. 9.
Figure 10A:
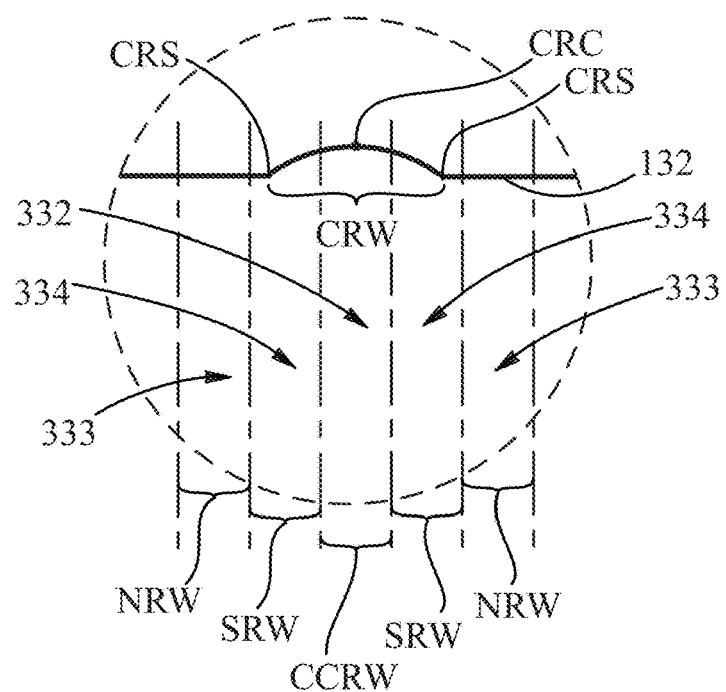
FIG. 10A is an enlarged partial cross-sectional view of portion 10A of FIG. 10.

FIG. 10 shows how the effect structures 300 in at least the skin region 315 can be reoriented during the blowing step of the blow molding process when the preform 10 is transformed into an article 100. During the blowing process, the cavities 320 of the preform 10 are transformed into corresponding cavity regions 330 in the article 100. As shown in FIG. 10A, each cavity region 330 includes a cavity central region 332 that, after blowing, corresponds generally to the central portion 322 of the preform 10 and at least one cavity side region 334 that, after blowing, corresponds generally to the side portion 324 of the preform 10. Like the cavities 320, the cavity regions 330 each have a cavity region width CRW, a cavity region length (not shown), a cavity region center CRC, and two opposed cavity region sides CRS. The cavity region length is the longest dimension of the cavity region 330 and the cavity region width CRW is the shorter dimension of the cavity region 330 generally perpendicular to the cavity region length. If the cavity region 330 has no perpendicular dimensions that are different from each other, then the cavity region width CRW should be taken as the shortest dimension in the particular region being evaluated and the cavity region length is perpendicular to the cavity region width CRW. The cavity region center CRC is located at the center of the cavity region 330 in the width W dimension (i.e. equidistant between the cavity region sides CRS). Each cavity region 330 has a cavity central region 332 centered around the cavity region center CRC. The cavity central region 332 has a cavity central region width CCRW that is ½ the cavity region width CRW. Each cavity region 330 also includes two cavity side regions 334 disposed on opposite sides of the cavity central region 332. The cavity side regions 334 have a side region width SRW that is equal to the cavity central region width CCRW and extend outwardly from the central region 332 beyond the cavity region sides CRS. Extending outwardly (away from the cavity region center CRC) from each cavity side portion 334 is a non-cavity region 333 that has a non-cavity region width NRW that is the same as the cavity central region width CCRW and the side region widths SRW.

As shown, the orientation of the effect surfaces 310 of the effect structures 300 disposed outside of the cavity regions 330, for example in the non-cavity regions 333, remains generally unchanged from the orientation that they had along the outer surface 133 of the preform 10 prior to blowing the preform 10 into the article 100. Specifically, the effect structures 300 disposed in the non-cavity regions 333 and adjacent the outer surface 133 of the article 100 remain oriented generally parallel to the outer surface 133 of the article and their Average Normal Orientation is generally perpendicular to the outer surface 133. At least some of the effect structures 300 disposed in the cavity side regions 324, however, are oriented such that the orientation of their normal N is at an angle 355 other than perpendicular to the outer surface 133 of the article 100. For example, the at least some of the effect surfaces 310 of the effect structures 300 in the cavity side regions 324 may be disposed at an angle 355 having an absolute value of between about: 3 degrees, 4 degrees, 5 degrees, 6 degrees, 7 degrees, 8 degrees, 9 degrees, 10 degrees; and 90 degrees, 89 degrees, 87 degrees, 50 degrees, or 30 degrees from perpendicular to the outer surface 133 of the article 100 when measured as set forth in the Measurement Methods section, below. Also, depending on the geometry of the cavity 320 prior to blowing the preform 10 into the article 100, at least some of the effect surfaces 310 of the effect structures 300 disposed in the cavity central regions 332 may be oriented generally parallel to the outer surface 133 of the article, and their normal N oriented generally perpendicular to the outer surface 133.

Figure 11:
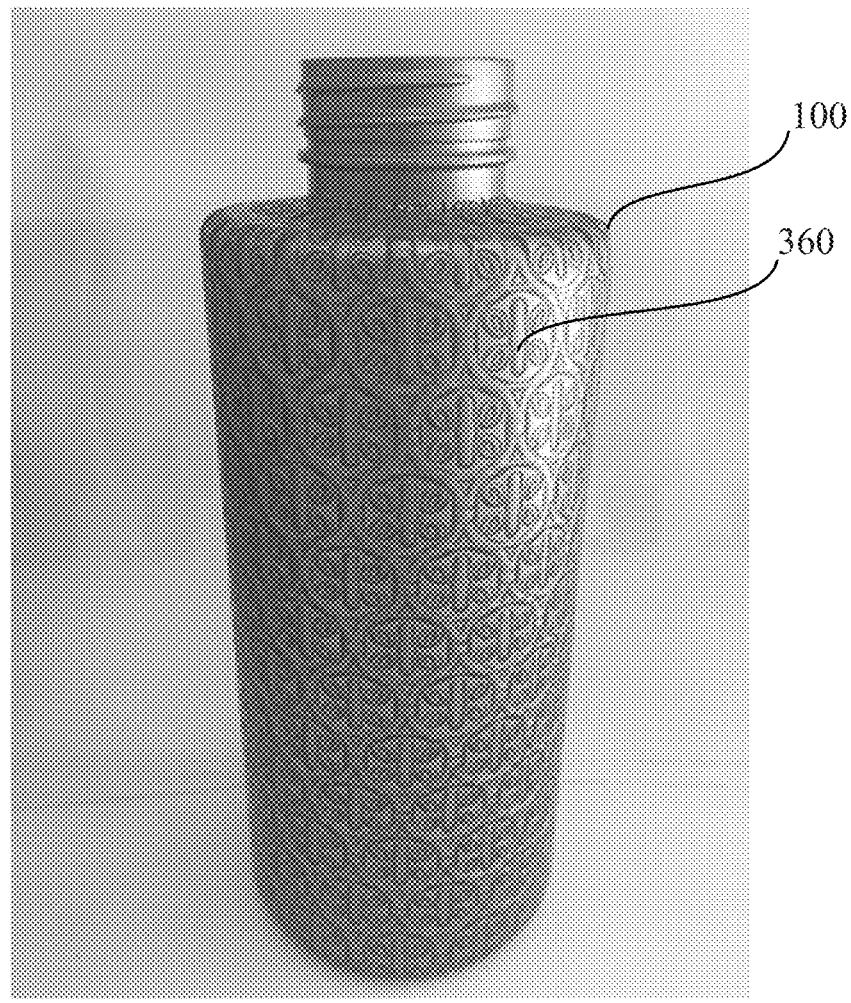
FIG. 11 is an example of an article made in accordance with the present invention and including a dimensional visual effect.

It has been found that selectively varying the orientation of the effect surfaces 310, in at least some regions, can provide unique and unexpected aesthetic features 112 on the article 100. Specifically, it has been found that selectively varying the orientation of the effect surfaces 310 can provide a visual effect 360, an example of which is shown in FIG. 11. The visual effect 360 may be, for example, a dimensional visual effect (e.g. providing the viewer with the perception of depth, texture, and/or three-dimensions) or otherwise. The shape of the visual effect 360 on blow molded articles 100 can be random or predetermined. For example, visual effect 360 having a predetermined shape can be the same as or similar to that of the three-dimensional pattern 325 of cavities 320 on the preform 10 and can correspond to a location on the article 100 that corresponds to the location of the three-dimensional pattern 325 on the preform 10 or can be otherwise planned prior to its formation. Of course, there will typically be some change in shape and dimensions between the preform 10 and article 100, but one can typically determine which cavities 320 form which visual effects 360 or portions thereof. Random visual effects 360 do not correspond to any predetermined pattern associated with the preform 10.

An especially useful feature of the visual effect 360 is that it can be provided even in embodiments where the outer surface 133 of the article 100 is relatively smooth. As noted above, this can provide several benefits, including ease of labeling and printing on the outer surface 133, tactile benefits, aesthetic benefits, handling benefits, manufacturing benefits and an unexpected sensory experience for the user. Further, the visual effect 360 can be used in combination with other aesthetic and textural elements to provide even more unique and desired effects. Another useful aspect of the visual effect 360 of the present invention is that it can be predetermined (i.e. user can choose the pattern of the visual effect) and intentionally provided by the methods described herein, including etching the preform 10 and/or otherwise mechanically or chemically manipulating the outer surface 33 of the preform 10 to provide one or more cavities 320. Thus, the unique and unexpected visual effect can be incorporated into articles manufactured on commonly used blow molding equipment.

FIG. 11 represents a photograph of an article 100 in accordance with the present invention. The article 100 includes a dimensional visual effect 360 as set forth herein. The article 100 shown has a generally smooth outer surface 133, but the dimensional visual effect 360 provides the article 100 with an aesthetic feature that appears to have texture, three-dimensions, and/or depth. Such aesthetic qualities are often associated with high-quality and luxury goods and may be preferred by consumers over goods with less unique and/or less aesthetically pleasing aesthetic features.

Figure 12:
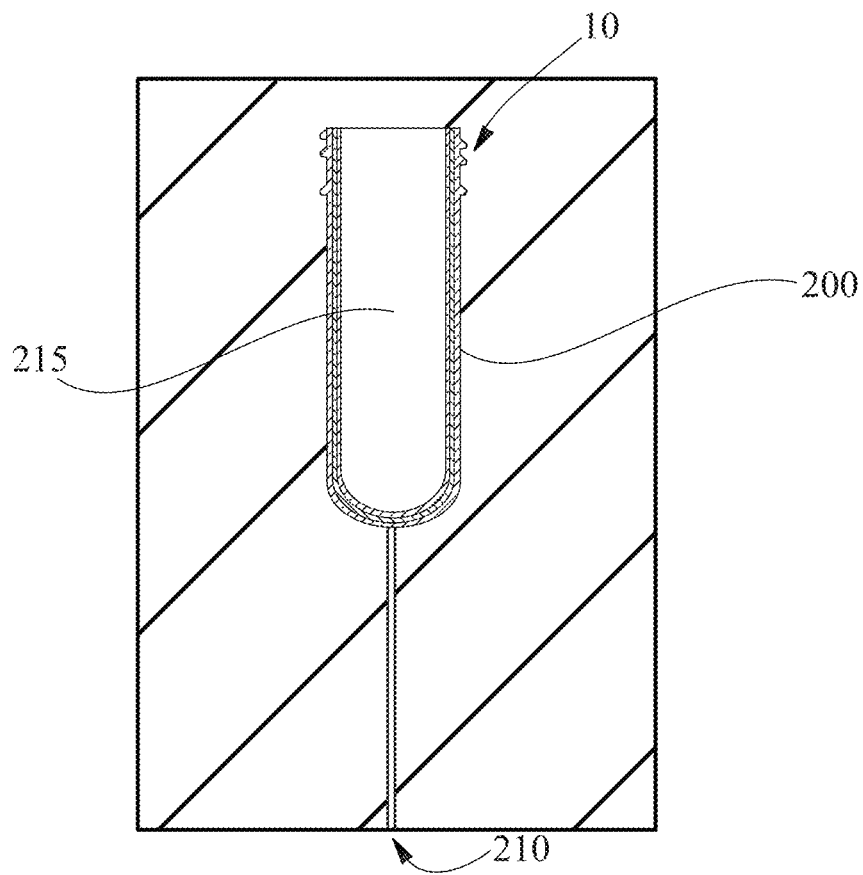
FIG. 12 is a cross-sectional view of an exemplary mold for forming an injection-molded preform.

Method of Making Blow Molded Article:

As noted above, the article 100 of the present invention can be made by blow molding, including, but not limited to EBM, IBM or ISBM. In such methods, the article 100 is formed from a preform 10, such as the one shown in FIG. 1. The preform 10 can be made by any known method, including injection, 3D printing or any other suitable method. FIG. 12 shows an example of a preform 10 in an injection preform mold 200 after the material making up the preform 10 has been injected into the preform mold cavity 215 of the preform mold 200 and the preform 10 has been formed into the desired shape. The material making up the preform 10 is injected into the mold through orifice 210. After the material is cooled or otherwise modified such that the preform 10 can maintain its shape, the preform 10 is removed from the mold 200. The preform 10 may be subjected to any number of post-molding techniques, including, but not limited to chemical treatments, heating, cooling, light, mechanical manipulation, such as, for example, cutting, etching, scraping, bending, coating, etc. These techniques can help provide the preform 10 and/or final article 100 formed from the preform 10 desired properties.

Figure 13:
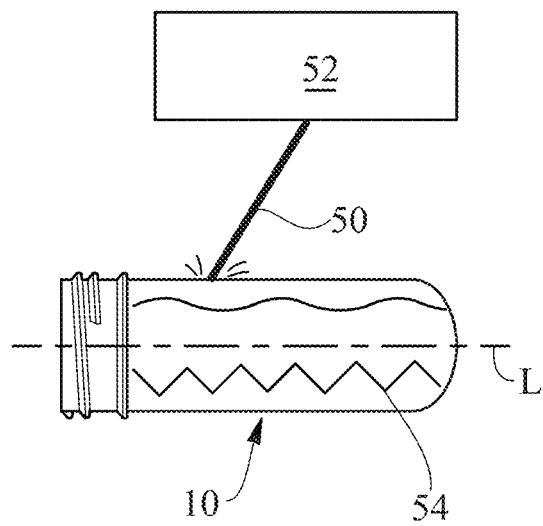
FIG. 13 is a perspective view of a preform being etched by a laser.

In accordance with the present invention, the outer surface 33 of the preform 10 may be provided with a preform texture, such as, for example, in a pattern such as predetermined pattern 54. Although the preform texture could be provided by the preform mold 200, as noted above, such processes are very limited in the preform textures that they can create due to the requirement that the preform 10 be removed from the mold 200. As such, it is preferred that the preform 10 be provided with the preform texture after it is removed from the mold 200. As shown in FIG. 13, the preform 10 may be laser-etched by one or more lasers 52. The laser(s) 52 can direct one or more laser beams 50 to modify or remove a portion of the outer surface 33 of the preform 10. The material ablated or removed can create a pattern and/or a preform texture on the outer surface 33 of the preform 10. The predetermined pattern 54 or preform texture can include any number of lines, shapes, dots, curves, indicia, letters or combinations thereof. Any portion of the outer surface 33 of the preform 10 may be laser-etched or otherwise modified and the modification process can take place at one time or in multiple different steps. The preform 10 may be rotated about its longitudinal axis L during etching to allow the etching device to etch the outer surface 33 about the circumference of the preform 10 or the etching device may be rotated about the preform 10, or both can be rotated.

Figure 14:
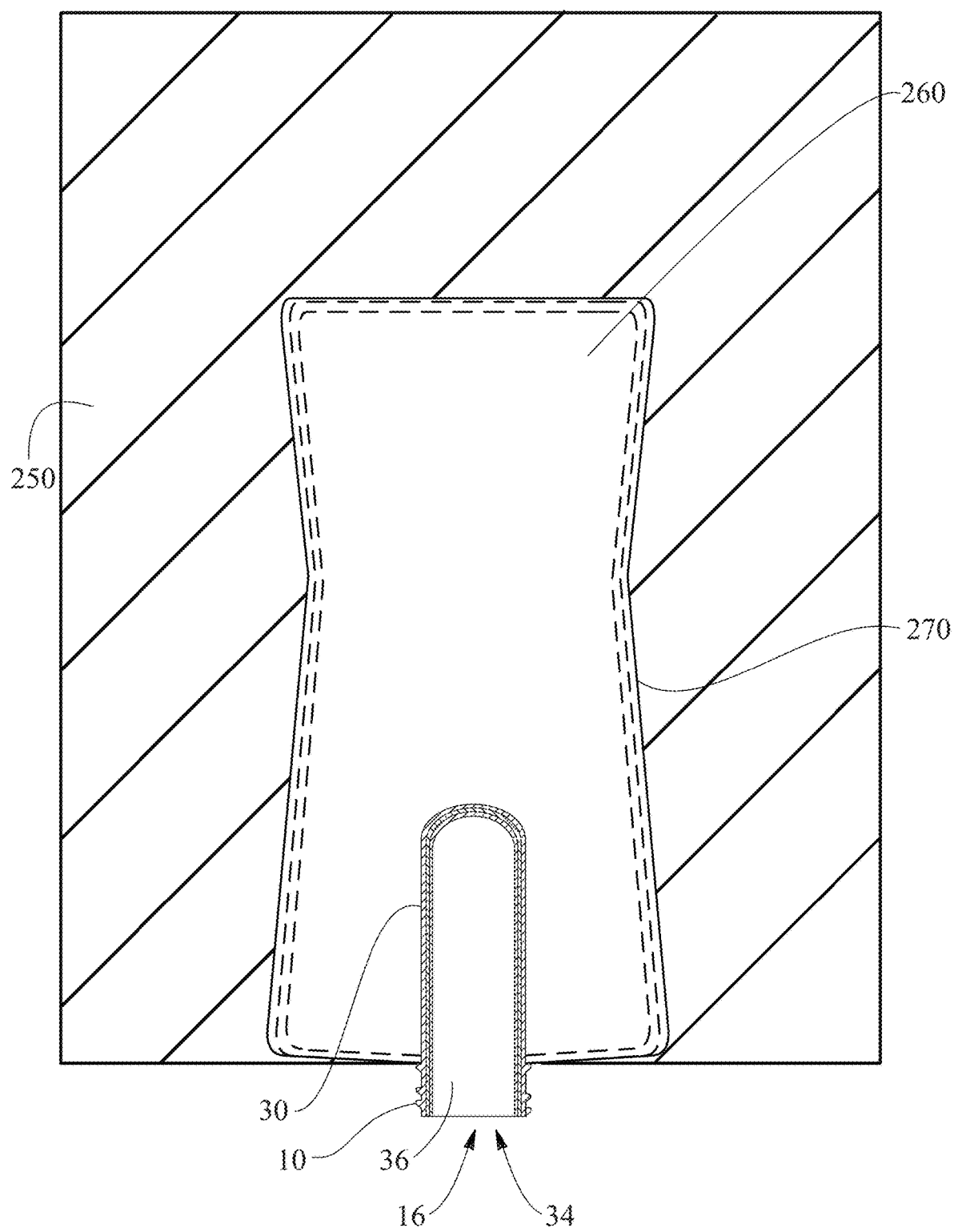
FIG. 14 is a cross-sectional view of a blow mold in accordance with the present invention.

Once the desired preform texture or pattern is applied to the preform 10, the preform may be moved to a blow molding step to form the final article 100 or may be stored or otherwise treated for different properties. Generally, just prior to the blow molding step, the preform 10 is heated or otherwise treated to soften it from a hardened state. This allows the preform 10 to be more easily blown into the shape of the final article 100. Often, the preform 10 is heated by lamps, hot air, radiation or convection, but other methods of heating the preform 10 can be used. When the preform 10 is ready to be "blown" or expanded into the shape of the final article 100, it is placed into a blow mold, such as for example, the one shown in FIG. 14. The blow mold 250 has a cavity 260 formed by walls 270. The cavity 260 is the shape of the final article 100. The walls 270 may be smooth or may have some texture. The preform 10 in the mold 250 is expanded such that the walls 30 of the preform 10 contact the walls 270 of the blow mold 250 and take the shape of the cavity 260. Generally, the preform 10 is expanded by forcing air or another fluid into the opening 34 of the preform through the open end 16 of the preform. If desired, a vacuum created in the cavity 260 can assist the expansion of the preform 10. Once the preform 10 is expanded into the shape of the mold 250 and thus, the final article 100, the article 100 can be cooled and the blow mold 250 can be removed. The article 100 can be subjected to additional processing steps, including but not limited to inspection, removal of imperfections, cleaning, filling, labeling, printing, and sealing.

It is possible to configure the blowing process such that some or all of the preform texture creates a texture 110 of the article 100. Surprisingly, the blow molding process can be configured to create the texture 110 on the inner surface 132 of the article 100, the opposite surface of the wall 150 where it was originally etched or otherwise created. This is especially surprising for thermal etching on the external surface of the preform 10. In order to reach temperatures sufficient for thermal ablation and material vaporization, typically a zone of melted or heat affected material is generated. This melted or heat affected zone can create thermally induced crystallization on the external surface. Crystallized material can resists stretching and reforming to the surface of the blow cavity and may rebound from the surface of the blow mold. To help create a smooth outer surface 133, the amount of thermal crystallization on the external surface should be controlled (via efficient ablation on the external surface), and the blowing parameters should be optimized for the desired end result. For example, it may be helpful to 1) minimize additional thermal crystallization on the external surface, 2) optimize the strain induced crystallization, and 2) set the material in the mold to avoid concave or convex surfaces in the transition from thick to thin surfaces.

According to the present invention, it has been found, for example, if the preform 10 is laser-etched on the outer surface 33, the final article 100 can have a texture 110 corresponding to the laser-etching pattern on its inner surface 132. This transfer of the preform texture to the inner surface 132 of the article 100 can allow the article 100 to have unique and aesthetically pleasing features compared to previously known articles 100. One example, as described in more detail above, is a bottle having a smooth article outer surface and an aesthetic feature 112 that gives the appearance of thickness, depth and/or texture to the bottle. Such aesthetic features can make the bottle more attractive and more consumer preferred. Additionally, because the article 100 can be provided with a smooth article outer surface 133, it can be more easily labeled and/or have printing applied thereto. Further still, because the method provides a way to add a texture, pattern or functional feature to the preform 10 after it is out of the preform mold 200, it can significantly simplify the process for making complex features on the end article 100. This also allows for the functional, textural and/or aesthetic features of the end article 100 to be changed despite the preform 10 being from the same preform mold 200 and allows for much quicker and more efficient changes to the overall aesthetics, texture or functional features of the article 100 because new preform molds 200 are not needed if it is desired to change the resulting article 100. Thus, small productions batches and even customized articles become economically feasible.

In addition to the above, if effect structures 300 are incorporated into the preform 10, unique visual effects 360 may be provided in the article 100. The method used to produce such visual effects 360 is the same as set forth above for other visual and textural effects except that a multiplicity of effect structures 300 are incorporated into the material(s) making up the wall(s) 30 of the preform 10. In one exemplary and non-limiting embodiment, the preform 10 includes a single-layer of material having an effect pigment included therein. The effect pigment, and thus the walls 30 of the preform 10 included a multiplicity of effect structures 300 each having an effect surface 310. The normals N of the effect surfaces 310 are aligned generally perpendicular to the outer surface 33 of the preform wall 30, at least adjacent the outer surface 33, after the preform 10 is formed. The outer surface 33 of the preform wall 30 may be etched, for example, with a laser 52 resulting in several cavities 320 in the outer surface 33 of the preform 10. The effect surfaces 310 of the effect structures 300 adjacent the outer surface 33 remain aligned generally parallel to the outer surface 33 (their normals N being generally perpendicular to the outer surface 33) after etching and prior to the preform 10 being blown into the article 100.

Blow molding of the etched preform 10 including effect structures 300 into an article 100 allows the user to reorient at least some of the effect surfaces 310 of the effect structures 300 into a predetermined pattern that can provide a desired visual effect 360. For example, the effect surfaces 310 of the effect structures 300 adjacent the outer surface 133 of the article 100 remain aligned generally parallel to the outer surface 133 of the article 100, except in the cavity side regions 334 of the cavity regions 330. However, at least some of the normals N of the effect surfaces 310 of the effect structures 300 disposed in the cavity side regions 334 are oriented differently than the normals N of the effect surfaces 310 of the effect structures 300 located outside of the cavity regions 330 and at least some of those located fully within the cavity central regions 332. Rather than being oriented generally perpendicular to the outer surface 133 of the article 100, at least some of the normals N to the effect surfaces 310 of the effect structures 300 disposed in the cavity side regions 334 are at an angle from perpendicular to the outer surface 133. Specifically, on average, the orientation of the normal N of the effect surfaces 310 of the effect structures 300 disposed in, for example, the cavity side regions 330, have an absolute value angle 355 of between about: 3 degrees, 4 degrees, 5 degrees, 6 degrees, 7 degrees, 8 degrees, 9 degrees, 10 degrees; and 90 degrees, 89 degrees, 87 degrees, 50 degrees, or 30 degrees from perpendicular to the outer surface 133 of the article 100 when measured as set forth in the Measurement Methods section, below. Of course, other angles 355 are contemplated for the orientation of the effect structures 300, but those set forth above have been found to be particularly effective producing a visual effect 360 on the article 100.

It has been found that articles including at least two regions of different Average Normal Orientations (calculated as set forth in the Measurement Methods section, below) of effect structures 300 can provide desirable visual effects 360. For example, an article 100 having a region having a first Normal Average Orientation and a region having a second Average Normal Orientation, wherein the absolute value of the difference between the two is greater than about 3, 4, 6, 7, 8, 9, 10, 12, 14, 16, 18, 20, 25, 30, 35, 40, 50 can provide desirable and unique visual features on the article 100. This absolute value of the differences is referred to herein as the Local Orientation Index ("LOI") for a particular visual effect 360 or portion thereof. Preferably, the LOI is at least 3 as that is consistent with the minimum perceptible by an unaided human eye. However, the LOI can be any number that provides the desired effect.

If desired, it is also possible to measure the LOI of regions within the visual effect 360 that are not adjacent the boundary 515 as compared to regions outside of the visual effect 360. The same method for determining LOI is used as described in the Measurement Methods section, herein, except that a region within the visual effect 360 that is not adjacent the boundary 515 is compared to a region outside the visual effect, as described in the LOI method. It has been found that for certain visual effects 360, the LOI of such regions within the visual effect 360, but not adjacent the boundary 515 as compared to regions outside the visual effect 360 may be zero, close to zero, below 4, below 3, below 2, or below 1. This is because the Average Normal Orientation of the effect structures 300 within the visual effect 360 and not adjacent the boundary 515 may be equal to or about equal to the Average Normal Orientation of the effect structures 360 outside of the visual effect 360. Without being bound by theory, it is theorized that such is the case because the effect structures 300 in portions of the visual effect 360 corresponding to the cavity central portion 322 of the preform 10 are not reoriented during the blow molding process and thus, remain in an orientation similar to the effect structures 300 disposed outside of the visual effect 360.

The depth and width of any particular cavity 320 can impact the visual impression of the visual effect 360. Typically, the width W of a cavity 320 should be at least 0.015 mm so as to ensure the resulting visual effect 320 is easily visible. The depth D of the cavity (measured the same as the depth of an etch) can be any suitable depth, but is typically between about 0.001 mm to about 2 mm; between 0.01 mm to about 1 mm; or from about 0.08 mm to about 0.5 mm. The orientation of the walls of the cavity 320 as compared to the surface of the preform 10 can be any suitable angle.

The type and amount of effect pigment included in any material of the preform can be chosen based on the desired look of the article 100 including the visual effect 360. In general, it is more cost effective to include more smaller particles than fewer larger particles, but no specific particle size or shape is required. Non-limiting examples of particle sizes include those with dimensions from about 1 micron to about 700 microns in length and a thickness of between about 5 nm to about 1200 nm. Besides the effect pigment(s), other materials may be included in the material that makes up the preform 10, including opacifiers, toner pigments, additives, dyes and the like.

Measurement Methods

Layer Thickness:
Layer thickness is measured with an industrial microscope, such as Olympus BX Series Optical Microscope having an accuracy of 0.003 mm, at two or more locations in the region of the article where the layer thickness is measured.

Wall Thickness:
Wall thickness is measured with a digital micrometer, such as a Shinwa 79523 Digital Micrometer having an accuracy of +/−0.003 mm, at two or more locations in the region of the article where the wall thickness is to be measured.

Average Normal Orientation and Local Orientation Index:
The methods set forth herein describe how to measure the normal orientation of effect structures disposed within a layer of material as well as the Average Normal Orientation of effect structures in a defined region and the LOI of a particular sample. To help better understand the methods, a brief summary is set forth here and then a specific example is disclosed.

Figure 15:
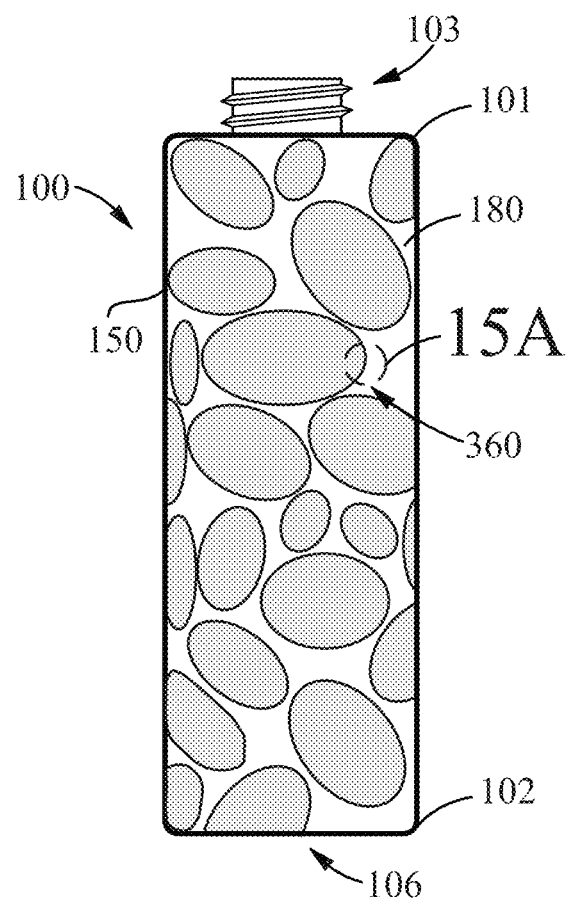
FIG. 15 is a plan view of an botte in accordance with the present invention.
Figure 15A:
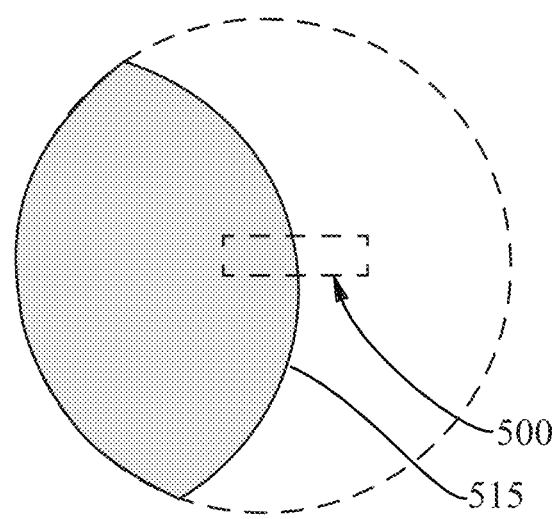
FIG. 15A is a magnified top view of the circle 15A of FIG. 15.
Figure 16:
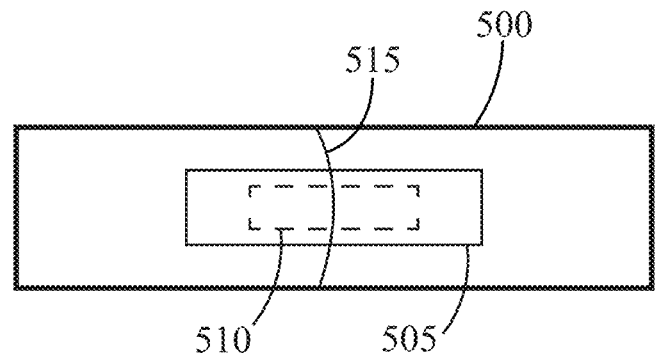
FIG. 16 is a magnified top view of a portion of the bottle of FIG. 15.

Before determining the Average Normal Orientation of any group of effect structures or the LOI of any portion of an article, it is important to identify the particular regions of the article that will be measured and the effect structures within the measured region that will be analyzed. Thus, article 100, such as bottle 180 shown in FIG. 15 is visually inspected by a human having 20/20 vision (or the equivalent due to correction by glasses, contact lenses or surgery) to find a location on the wall sample from the wall 150 of the bottle 180 including a visual effect 360. The visual effect 360 chosen should be located so as not to completely overlap the neck 103, first shoulder 101, second shoulder 102 or base 106 of the bottle 180, and if possible, not overlap at all with any of such portions or other irregularities in the outer surface 133 of the bottle 180. Once the visual effect 360 is chosen, a suitable portion of the visual effect 360 should be identified that has a visually perceptible boundary 515, as shown in FIG. 15A, between the visual effect 360 and a portion of the bottle 180 free from the visual effect 360. The sample portion 500 of the bottle 180 to be analyzed should include the suitable portion of the visual effect 360 as well as the adjacent portion of the wall 150 of the bottle 180 that does not include the visual effect 360. In certain instances, the sample 505 taken from the sample portion 500 may include more than one boundary 515. In such instances, the LOI can be measured for a single boundary 515 or any number of the boundaries 515 in the sample 505. The sample portion 500 should be generally rectangular in shape where the short dimension is parallel to the visual effect boundary 515 and the long dimension is perpendicular to the visual effect 360. The sample portion 500 should be carefully removed from the bottle 180 such that it is not deformed or damaged and so that it can be further cut into the specific sample size, such as sample 505 shown in FIG. 16, to be analyzed.

Once the sample 505 is obtained, it is scanned with a Computed Tomography (CT) system (equipped with a microscope, as needed) at a sufficient resolution to characterize the shape of the effect structures 300 therein. The x-ray energy and contrast mode of the CT is set to optimize the signal due to the effect structures 300 versus the signal from the material making up the wall 150 of the article 100 (e.g. plastic or polymeric material). Because the CT data may contain "noise" or "artifacts" and the sample 505 may contain secondary pigmentation or additives based on isotropic particles (for example, traditional pigments and/or reheat additives), to enable identification of an effect structure 300, it is first important to characterize the general shape parameters of the effect structures 300. The shape parameters of the effect structures 300 may be obtained from the CT data, but the parameters may be supplemented by or obtained from the manufacturer's specifications or other imaging systems and methods.

Figure 17:
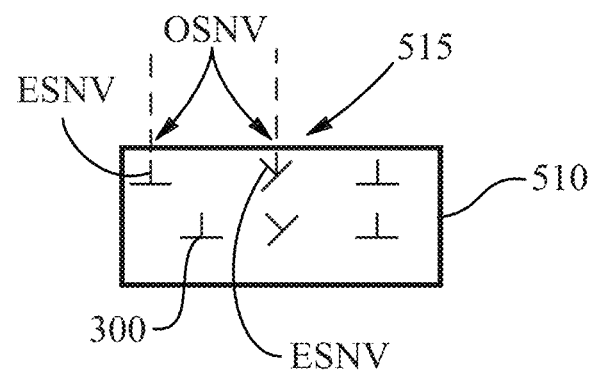
FIG. 17 is a magnified side view of the portion of the bottle of FIG. 16.

After the shape parameters of the effect structures 300 are known, the orientation of the effect structures 300 within the sample 505 can be determined. The orientation information can be obtained from a CT scan taken of the sample 505. The CT scan can be the same as that which is used to characterize the shape of the effect structures 300 or a separate scan used only to determine the effect structure 300 orientation. Starting with the sample 505, a measurement area 510 is identified that extends across the boundary 515 of the visual effect 360 and the portion of the sample 505 that does not include the visual effect 360. The sample's CT scan data is segmented, using an intensity threshold, into 3D voxel blobs which will be considered candidates for the effect structures 300. The previously determined shape parameters are then used to refine the voxel blobs, such as to separate voxel blobs representing effect structures 360 from voxel blobs that were caused by noise, artifacts, etc. An effect structure normal vector ESNV (as shown in FIG. 17) is calculated for each effect structure 360 and is compared in the plane perpendicular to the boundary 515 (or perpendicular to the tangent of the boundary at the center of the boundary 515 in the sample) of the visual effect 360 to an outer surface normal vector OSNV of the outer surface 133 of the article 100. If the angle between the ESNV and OSNV is obtuse, the direction of the ESNV should be reversed making the measured angle acute. The OSNV at a surface point of the article should be extended towards the effect structure 300 until it intersects an effect structure 300 with an ESNV. The acute angle between the ESNV and OSNV is recorded for that point.

Figure 18:
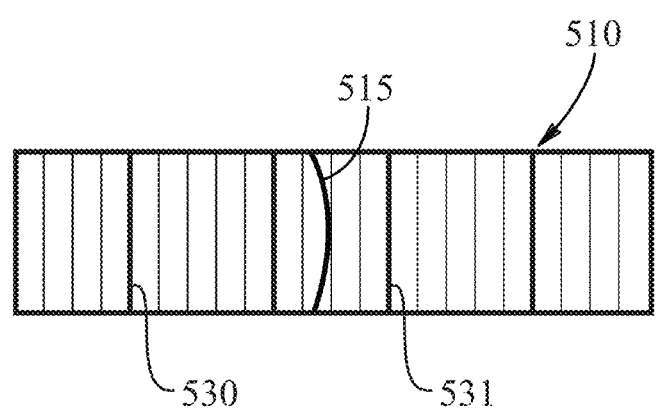
FIG. 18 is a magnified top view of the portion of the bottle of FIG. 17.
Figure 19:
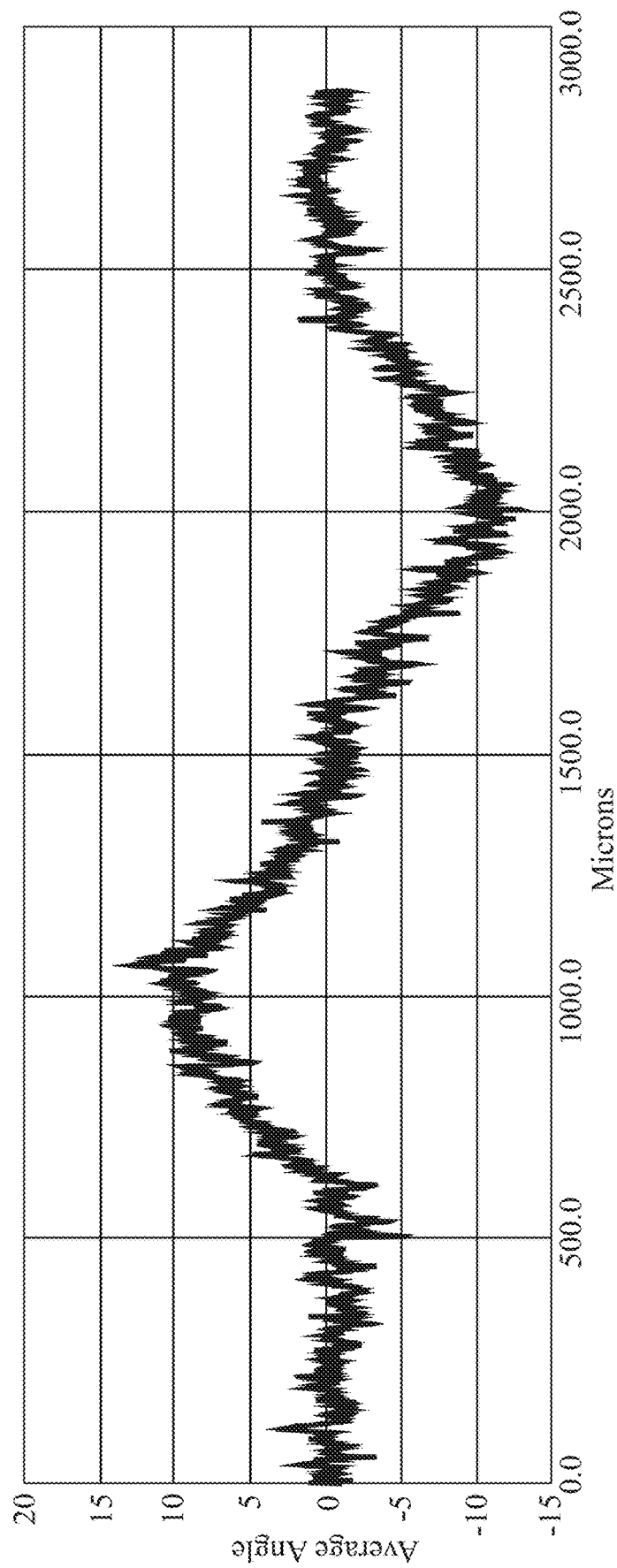
FIG. 19 is a curve of the averages of the angles between the article surface and the normal of the underlying effect structures set forth in the Example.
Figure 20:
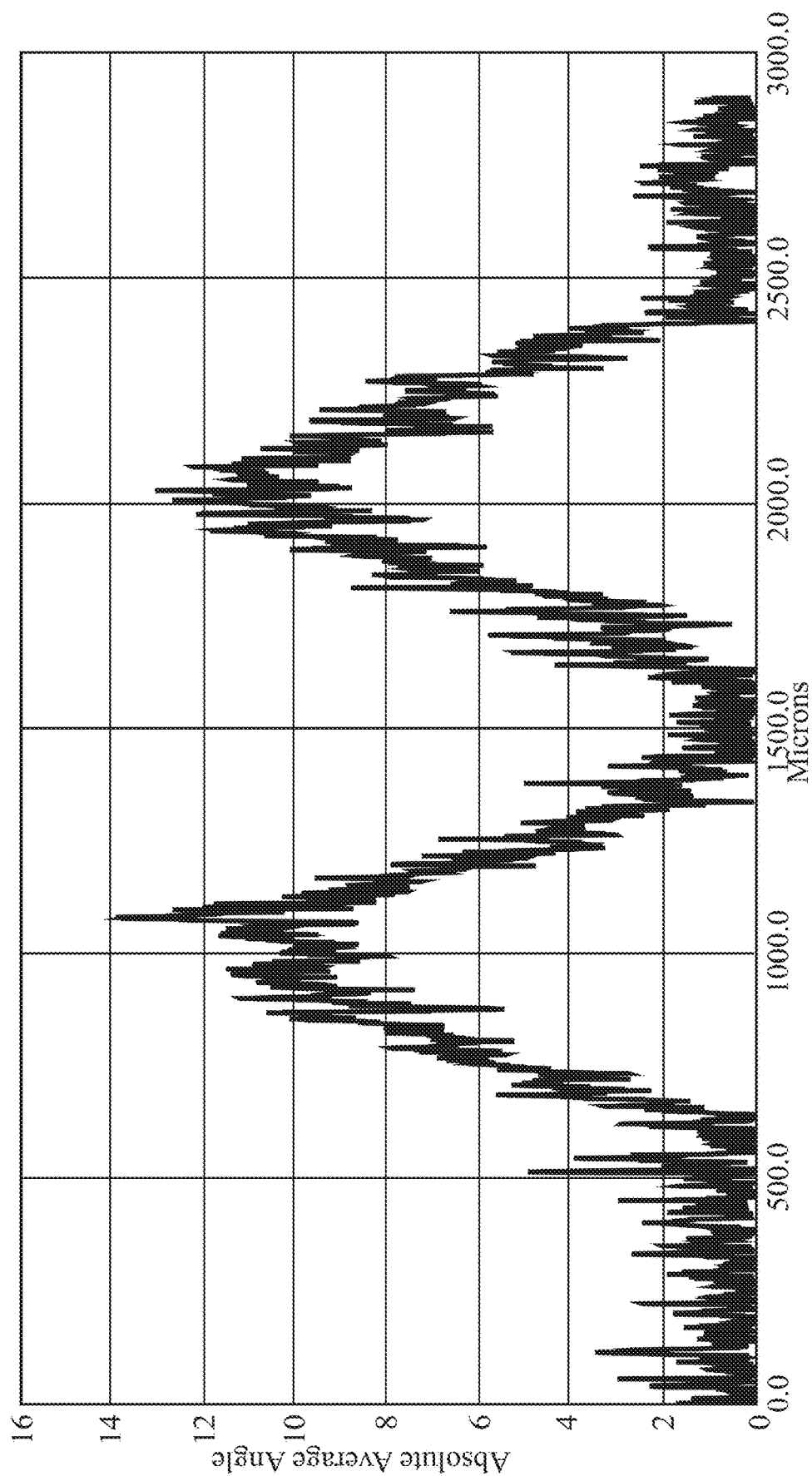
FIG. 20 is a curve of the absolute value of the averages of the shown in FIG. 19.

As shown in FIG. 18, the angles between the effect structure normal vector ESNV and the outer surface normal vector OSNV for each point on the outer surface 133 of the article 100 in each is measured and averaged across the width of the measurement area 510. The averages are plotted as a first curve, such as that shown in FIG. 19, and the magnitude (absolute value) of the averages are plotted on a second curve, as shown in FIG. 20.

The maximum and minimum values are identified from the magnitude on the second curve. As shown in FIG. 18, an inner square averaging area 530 from the sample is defined within the visual effect 360 and one is defined close to, but located outside of the visual effect 360. The inner square averaging area 530 within the visual effect 360 is centered on the location of the maximum average magnitude as identified from the second curve. Averaging the acute angles between the ESNV and OSNV within this square area provides an Average Normal Orientation for the effect structures 300 within the visual effect 360. A outer square averaging area 531 is defined outside of the visual effect 360 centered on the location of the minimum averaged magnitude as identified from the second curve. Averaging the acute angles between the ESNV and OSNV within this square area provides an Average Normal Orientation for the effect structures 300 outside of the visual effect 360. The Average Normal Orientation of the effect structures 300 within the visual effect 360 is compared to the Average Normal Orientation of the effect structures outside of the visual effect 360. The absolute difference between the two Average Normal Orientation values gives the Local Orientation Index ("LOI") for the visual effect 360.

It should be noted that in some embodiments, a minimum can also be identified that is located within the visual effect 360. This minimum is ignored for the purpose of determining the LOI of the region within the visual effect 360 adjacent the boundary 515 versus an area outside the visual effect 360, but may be used to calculate the LOI of a region within the visual effect 360 not adjacent the boundary 515 versus an area outside the visual effect 360.

Further details related to the methods for measuring Average Normal Orientation and Local Orientation Index are set for in the Example, below.

Root Mean Square Roughness (Sq):

Root Mean Square Roughness, Sq, is measured using a 3D Laser Scanning Confocal Microscope such as a Keyence VK-X200 series microscope available from KEYENCE CORPORATION OF AMERICA) which includes a VK-X200K controller and a VK-X210 Measuring Unit. The instrument manufacturer's software, VK Viewer version 2.4.1.0, is used for data collection and the manufacturer's software, Multifile Analyzer version 1.1.14.62 and VK Analyzer version 3.4.0.1, are used for data analysis. If needed, the manufacturer's image stitching software, VK Image Stitching version 2.1.0.0, can be used. The manufacturer's analysis software is compliant with ISO 25178. The light source used is a semiconductor laser with a wavelength of 408 nm and having a power of about 0.95 mW.

The sample to be analyzed is obtained by cutting a piece of the article out of the article that includes the region to be analyzed in a size that can fit the microscope for proper analysis. To measure Sq of an etched portion of an article, a sample should be obtained that includes an etched region and the analysis should take place only over the portion of the sample that is etched. If the sample is not flat, but is flexible, the sample may be held down on the microscope stage with tape or other means. If, due to the shape, flexibility or other characteristic of the sample, measurements will be more accurate when the sample is not flattened, corrections may be sued, as explained hereinbelow.

The measurement data from the sample is obtained using a 20× objective lens suitable for non-contact profilometry, such as a 20× Nikon CF IC Epi Plan DI Interferometry Objective with a numerical aperture of 0.40. The data is acquired using the acquisition software's "Expert Mode", with the following parameters set as described here: 1) Height Scan Range is set to encompass the height range of the sample (this can vary from sample to sample depending on the surface topography of each); 2) Z-direction Step Size is set to 0.50 micrometers; 3) Real Peak Detection mode is set to "On"; and 4) Laser Intensity and Detector Gain are optimized for each sample using the autogain feature of the instrument control software.

Prior to analysis, the data is subjected to the following corrections using the manufacturer's Multifile Analyzer software: 1) 3×3 median smoothing in which the center pixel of a 3×3 pixel array is replaced by the median value of that array; 2) noise removal using weak height cut (following built in algorithm in the analysis software), and 3) shape correction using waveform removal (0.5 mm cutoff). The Reference Plane is specified using the Set Area method and selecting the same area as is used for the shape removal. Regions including foreign materials, artifacts of the sample harvesting process or any other obvious abnormalities should be excluded from analysis and alternative samples should be used any sample can't be accurately measured. The resulting value is the Root Mean Square Roughness, Sq, for the measured portion of the sample.

Sz—Maximum Peak/Pit Height:

Sz, the Maximum Peak/Pit Height, is measured using a 3D Laser Scanning Confocal Microscope such as a Keyence VK-X200 series microscope available from KEYENCE CORPORATION OF AMERICA) which includes a VK-X200K controller and a VK-X210 Measuring Unit. The instrument manufacturer's software, VK Viewer version 2.4.1.0, is used for data collection and the manufacturer's software, Multifile Analyzer version 1.1.14.62 and VK Analyzer version 3.4.0.1, are used for data analysis. If needed, the manufacturer's image stitching software, VK Image Stitching version 2.1.0.0, can be used. The manufacturer's analysis software is compliant with ISO 25178. The light source used is a semiconductor laser with a wavelength of 408 nm and having a power of about 0.95 mW.

The sample to be analyzed is obtained by cutting a piece of the article out of the article that includes the region to be analyzed in a size that can fit the microscope for proper analysis. To measure Sz of an article with etched and non-etched regions 113, a sample should be obtained that includes both the etched and non-etched regions 113. The analysis should take place over both the etched and non-etched regions 113. If the etched region has one axis that is longer than another, the long axis of the etched region to be measured should be oriented approximately perpendicular to the long axis of the image region. If the sample is not flat, but flexible, the sample may be flattened and held down on the microscope stage with tape or other means. If, due to the shape, flexibility or other characteristic of the sample, measurements will be more accurate when the sample is not flattened, corrections may be used, as explained hereinbelow.

Sz is obtained by acquiring and stitching together several contiguous images of the sample in the region of interest (e.g. a region including both etched and non-etched areas). The images are collected using 10× objective lens suitable for non-contact profilometry such as a 10× Nikon CF IC Epi Plan DI Interferometry Objective with a numerical aperture of 0.30, giving an image area of approximately 1430×1075 micrometers per image. The images are automatically stitched using the manufacturer's "VK Image Stitching" software. Data is acquired from the images using the acquisition software's "Expert Mode" wherein the following parameters are set as described herein: 1) Height Scan Range is set to encompass the height range of the sample (this can vary from sample to sample depending on the surface topography of each); 2) Z-direction step size is set to 2.0 micrometers; 3) Real Peak Detection mode is set to "On"; and 4) Laser Intensity and Detector Gain are optimized for each sample using the autogain feature of the instrument control software.

Prior to analysis, the data is subjected to the following corrections using the manufacturer's Multifile Analyzer software: 1) 3×3 median smoothing in which the center pixel of a 3×3 pixel array is replaced by the median value of that array; 2) noise removal using strong height cut (following built in algorithm in the analysis software), and 3) shape correction using the simplest method (plane, second order curve or waveform removal) sufficient to remove the shape of the surface. Regions including foreign materials, artifacts of the sample harvesting process or any other obvious abnormalities should be excluded from analysis and alternative samples should be used any sample can't be accurately measured. The shape of the surface is removed using the Waveform Removal method of the Surface Shape Correction tool. The cutoff wavelength is specified to be approximately five times the size of the largest structure to be preserved. The Reference Plane is specified using the Set Area method and selecting the same area as is used for the shape removal. The resulting value is the Sz for the measured portion of the article.

Example

First, an article is obtained that includes effect structures in at least a portion of the wall of the article. A sample portion of the article is identified by visually locating a visual effect on the article. The sample to be analyzed is prepared by cutting a rectangular piece from the wall of an article. The sample is centered such that the boundary of the visual effect is generally parallel to the short dimension of the sample. The sample includes portions of the article that include the visual effect and portions that do not include the visual effect so as to ensure the boundary of the visual effect are included in the sample. In this example, the sample included the full width of the visual effect including boundaries on either side of the visual effect and approximately 0.5 mm outside the visual effect. It is not critical that the sample span entirely across the visual effect. To obtain the sample, sharp scissors (or other cutting means that will not destroy the sample piece itself) are used to first cut a piece from the article wall that is approximately double the desired dimensions of the sample to be measured. In this example, a piece of the bottle in the size of about 2.6 mm×7 mm is cut from the bottle wall. A sharp single edge, GEM polytetrafluoroethylene (PTFE) coated stainless steel razor blade such as available from Electron Microscopy Sciences, 1560 Industry Road, Hatfield, Pa. 19440 (item #71970), or the like, is used to carefully trim the sample down to the desired dimensions, in this example, approximately 1.3 mm×3.5 mm.

The sample is then subjected to X-ray tomographic microscopy scanning using a synchrotron light source. The scanning for this example is performed at the TOmographic Microscopy and Coherent rAdiology experimenTs (TOMCAT) beamline of the Swiss Light Source (SLS) at the Paul Scherrer Institute (PSI, Switzerland). The sample is centrally positioned on a suitable mount (e.g. a 12 mm diameter mount) and adhered to its surface with black double-sided adhesive tape or an alternative suitable adhesive. A superficial fiducial mark on the corner of each sample is used to orient each sample verses the x-ray beam when the rotation stage is at 0 degrees. X-rays are converted to visible light by using a LuAG:Ce 20 µm scintillator, magnified with a 20× objective using a high-quality microscope such as an Optique Peter, Lentilly, France, with a 20× objective and detected by a sCMOS camera (PCO.Edge 5.2, PCO, Kelheim, Germany). The instrument's image acquisition settings are selected such that the image intensity contrast is sensitive enough to provide clear and reproducible discrimination of the sample structures from the air and the surrounding mount. The instrument is operated with the following settings: energy setting 19 keV, 1500 projections, 0.815 mm horizontal field of view with 0.688 mm vertical height, 250 ms exposure time and a resulting isotropic voxel size of 0.3186 The specific image acquisition settings and contrast mode are optimized to achieve the necessary contrast discrimination and a suitable resolution to continue analysis.

The scans are acquired with a multi-overlap method to precisely position each of 6 high resolution scans in a sequence to cover the length of sample (~3.5 mm) from edge to edge. The scan sequence is centered in the middle of sample with an overlap area approximately 0.24 mm between scans. Where the sample thickness (caliper) is larger than the slice stack height, a second stack scan sequence is acquired to cover the remaining sample thickness. When these data sets are merged by registering the overlapping areas, a contiguous composite of the entire length of the sample and its thickness is provided. Each scan of the sample is captured such that a similar volume is included in the dataset with dimensions of 2560×2560×2160. Tomographic reconstructions are performed using the Gridrec algorithm (F. Marone and M. Stampanoni, "Regridding reconstruction algorithm for real time tomographic imaging," *J. Synchrotron Rad.*, vol. 19, pp. 1029-1037, 2012) and the reconstructed tomography slices provided in 16-bit TIF format.

Software suitable for subsequent image processing steps and quantitative image analysis includes programs such as Avizo Light 2019.1 (Visualization Sciences 25 Group/FEI Company, Burlington, Mass., U.S.A.), and MATLAB version 9.5 with corresponding MATLAB "Image Processing Toolbox" (The Mathworks Inc. Natick, Mass., U.S.A.). In this example, the Synchrotron data is collected with a grey level intensity depth of 16-bit and is converted to a grey level intensity depth of 8-bit, taking care to ensure that the resultant 8-bit dataset maintains the maximum dynamic range and minimum number of saturated voxels feasible, while excluding extreme outlier values.

A slice of the continuous composite data matrix representing approximately 0.05×3.6×1.3 mm of the sample volume is used to determine the shape parameters of the effect structures. In this example, the effect structures which are added to the resin (Iriodin® 123 from Merck KGaA, Darmstadt, Germany) appear as platelets when visualized. At a voxel resolution of 318.6 nanometers, the resulting dataset is approximately 160×11500×4100 voxels. The density of the effect structures is sufficiently different from the density of the plastic that an intensity threshold can be determined using an automated technique known as Otsu method: Otsu, N., "A Threshold Selection Method from Gray-Level Histograms," *IEEE Transactions on Systems, Man, and Cybernetics*, Vol. 9, No. 1, 1979, pp. 62-66, which is implemented by MATLAB's "Multithresh" function. Collections ("blobs") of adjacent voxels that exceed the intensity threshold are numerical labeled using a connected components method such as the method available in MATLAB's "Bwconncomp" using a connectivity of 6. Blobs at the borders of dataset or near the edges of the bottle are eliminated.

Small blobs, some with a volume of single voxel, can be caused by noise in the acquisition system. Blobs with volumes less than or equal to 236 voxels make up only 5% of the total blob volume. These small blobs are eliminated from the analysis.

The voxel positions of a blob are passed as a cloud of points to a three-dimensional ellipsoidal fitting algorithm, such as the "regionprops3" function found in MATLAB. "Regionprops3" is requested to return the length in voxels of the ellipsoidal axes using the "PrincipalAxisLength" property. The smallest axis length corresponds to the thickness of the effect structures. In this example, a histogram of blob thicknesses is unimodal and shows that more than 98% had a thickness of 2 microns or less. Blobs greater than 2 microns are interpreted as touching platelets, artifacts, etc. and are eliminated from the data set. A thickness of 2 microns corresponds to the manufacturer's maximum thickness specification. The average thickness of the remaining blobs is 1.2 microns.

The aspect ratio of an effect structure is the ratio of its longest axis divided by its shortest axis. The larger the aspect ratio, the flatter the effect structure. In this example, a cumulative histogram of the aspect ratio shows an inflection at a value of about 4. Only 5% of the remaining blobs have an aspect ratio of less than 4. Thickness and aspect ratio, as described herein, were used to identify platelet blobs. In this example, blobs identified as platelets using the criteria described accounted for 90% of the starting blob volume.

An average thickness of 1.2 microns and an aspect ratio of at least 4 results in a minimum long dimension of about 5 microns. The sample volume for the angle analysis is increased to approximately 0.1×3.6×1.3 mm which assured multiple effect structures across the sample. At a voxel resolution of 318.6 nanometers, this results in a dataset of approximately 320×11500×4100 voxels. Assuming XYZ coordinates, the YZ plane cuts across a single visual effect in the article. The thickness of the article wall is measured along the Z axis. An effect structure with an effect structure normal vector ("ESNV") identical to the Z axis is nearly parallel to the XY plane.

In this example, the article is a bottle with an overall shape that approximates a cylinder. A visual effect parallel to the height axis of the cylinder was identified by visual inspection of the article. The sample was cut across the visual effect and therefore appears as an arc of a cylinder. The top of the outer surface of the sample was fitted to a circular arc using a middle YZ slice from the data set in the X direction. Visual inspection of XZ slices along the Y axis showed that the surface of the sample remained nearly constant in the X direction for this very narrow region. An arc fitted to the middle slice could therefore be replicated through all the YZ slices.

To determine an arc of the sample and the outer surface normal vectors ("OSNV"), an arc of less than 6 degrees was fitted using trial and error where each trial arc sampled the middle YZ slice voxel along the arc and calculated an average voxel value. The synchrotron data includes bright voxels along the interface of the plastic with the air due to diffraction affects. An arc mask 7 voxels wide (~2 microns) is generated and used as a template to calculate an average voxel value. At a minimum, the circular arc should touch the sample edge within a 5% distance from the end points and within a 10% distance from the arc center. Trial arcs of various sizes and displacements may be tested along with the maximum average voxel value to choose the final arc. The parameters of the fitting arc including its center are stored for later reference. The arc mask is extended towards the center to create a region of interest for effect structure measurements. The region of interest is also copied to all the YZ slices. The original fitting arc is subtracted from the region of interest to prevent edge diffraction voxels from being mis-labelled as effect structure voxels.

To find the effect structures, a threshold is determined by MATLAB's "Multithresh" function using voxels within the arc mask. Collections of adjacent voxels that exceed the intensity threshold are labeled as candidate effect structures. Candidate effect structures are tested for a volume at least 237 voxels, a thickness of no more than 2 microns and an aspect ratio of at least 4. An ESNV is determined using an ellipsoidal fit provided by the "regionprops3" function found in MATLAB using the "EigenVectors" property. The eigen vector corresponding to the thickness of the effect structure is projected to the YZ plane and used as the ESNV. Any effect structure that crosses outside of the region of interest is eliminated from the analysis.

The OSNV on the outer surface of the bottle is a ray that runs from a point on the arc to the center of the fitting arc circle. Thus, the OSNV lies on the YZ plane. The OSNV for each point on the article is compared to the ESNV of the effect structure directly beneath it in the YZ plane along the path of the ray. A line is drawn from the surface point using the straight edge of the surface normal to the first intersecting effect structure. A line that penetrates at least 90% of the sample without crossing an effect structure is flagged as a missed crossing and is ignored.

The acute angle between the OSNV and the ESNV is determined in the YZ plane. The surface of the sample can be defined as two-dimensional array where the width will represent one dimension and the arc length will represent the second dimension. Furthermore, the surface can define a one-dimensional first curve, if the angle between OSNV and ESNV is averaged within the voxel columns across the width dimension. This first curve, shown in FIG. 19 and representing Sample 2, gives an average angle between the article surface and the underlying effect structures as one moves across the visual effect. The absolute values or magnitude of the average angles is plotted as a second curve starting outside of the visual effect and proceeding across the boundary of the visual effect into the visual effect (for the first border). The same was done for the other border of the visual effect (the second border). Note that the averaging ignores missed crossings. The second curve, again representing Sample 2, is shown in FIG. 20. A maximum absolute average value can be located from the second curve.

An averaging region of interest is defined as 100 microns×100 microns square that spans the width of the sample. The average should exclude missed crossings and is herein referred to the Average Normal Orientation of the effect structures within the square region of interest. The maximum average located from the magnitude curve is taken as the center of the square region of interest and should fall within the visual effect. Examining the curve, from the maximum location towards the nearest end point outside of the visual effect can be used to locate a minimum absolute average value. The minimum location is chosen as the center-point for a 100 micron×100 micron region of interest outside the visual effect. If the minimum location is too close to the sample edge or to the visual effect to allow for 100 micron square area to be taken entirely outside the visual effect and within the sample area then the next lowest value on the curve outside the visual effect is chosen as the minimum. This process may need to be repeated until a 100 micron×100 micron region of interest outside the visual effect and within the sample area is defined. A Local Orientation Index for the sample is determined by calculating the absolute difference between the Average Normal Orientation of the effect structures within the visual effect and the Average Normal Orientation of the effect structures outside of the visual effect. For Sample 2, the Local Orientation Index for the first border is 11.6 and the second border is 11.3.

The results from three different bottles are shown in Table 1, below. Each sample included a visual effect 360 with two borders 515. However, it should be understood that any particular sample may include only a portion of a visual effect 360, such that it has only one border 515. The difference between the samples relates to the depth of the etch made in the preform that corresponds to the visual effect in the article. In addition, a prophetic example (Sample 4) is included to show the results of a bottle that includes effect structures, but for which there has been no selective modification of the orientation corresponding with a visual effect. Accordingly, it is expected that the Average Normal Orientation of the effect structures will be generally the same throughout the walls of the article and similar to that of Samples 1-3. The bottle of Sample 4 has a generally smooth outer surface.

TABLE 1

| Sample | Etch Depth (μm) | Average Normal Orientation Inside Visual Effect | Average Normal Orientation Outside Visual Effect | Local Orientation Index | Sz of Outside Surface of Bottle |
|---|---|---|---|---|---|
| Sample 1 | 434 | 26.7 | 0.5 | 27.2 | 17.2 |
| Border 1 | | −28.1 | 0.6 | 28.7 | |
| Border 2 | | | | | |

TABLE 1-continued

| Sample | Etch Depth (μm) | Average Normal Orientation Inside Visual Effect | Average Normal Orientation Outside Visual Effect | Local Orientation Index | Sz of Outside Surface of Bottle |
|---|---|---|---|---|---|
| Sample 2 | 219 | 10.9 | −0.7 | 11.6 | 8.7 |
| Border 1 |  | −11.0 | 0.3 | 11.3 |  |
| Border 2 |  |  |  |  |  |
| Sample 3 | 84 | 7.9 | 0.5 | 7.4 | 6.5 |
| Border 1 |  | −7.1 | −1.4 | 5.7 |  |
| Border 2 |  |  |  |  |  |
| Sample 4 | 0 | N/A - no Visual Effect. | 0.8 | 0 | 5 |

Samples 1-3 are made according the ISBM process described herein. The ISBM process starts with making a preform. The preform is molded by parallel co-injection Table 2, below, provides additional details about the makeup of the preform and the etching parameters of Samples 1-3.

TABLE 2

|  | Sample 1 | Sample 2 | Sample 3 |
|---|---|---|---|
| Preform Composition | PET + 10% masterbatch containing Iriodin ® 123 (approximately 30% loading) plus secondary color toner | PET + 10% masterbatch containing Iriodin ® 123 (approximately 30% loading) plus secondary color toner | PET + 10% masterbatch containing Iriodin ® 123 (approximately 30% loading) plus secondary color toner |
| Etching Parameters | 3000 | 6000 | 9000 |
| Depth of Etch (μm) | 434 | 219 | 84 | process. The resin blend for the ISBM process contains a thermoplastic resin and effect pigments. The raw materials for the blend are dried prior to processing. The dried blends are fed using a hopper mounted on a plasticizing screw extruder (single-screw design) where the stream of hot polymer melt enters the mold cavity. A single-cavity preform mold on a Fanuc Roboshot S-2000i275B injection molding machine is used to make performs from the molten discharge at a barrel temperature of about 270-310° C., and a part mold size of about 54.5 grams with mold cooling at about 13° C. The preform is ejected from the mold and allowed to cool at ambient conditions.

Once cooled, the preform is etched by a laser to create a predetermined pattern of cavities on the outer surface of the preform. A sealed carbon dioxide type laser is used which has power in the range of 40 W to 2.5 kW, and a laser wavelength of 9 microns to 11 microns. An example of such a laser is the LPM1000 laser available in LASERSHARP systems from LasX Industries, Inc. of White Bear Lake, Minn., United States. The three sample preforms are etched at three different laser parameters: 3000, 6000 and 9000, as shown in Table 1.

After etching the preform is placed in a 2-stage re-heat Stretch Blow Molding (SBM) machine, such as a Sidel™ SBO 2/10 Universal blow molding machine. The cooled preform is heated above the polymer softening temperature (Tg) using an infrared machine to about 100 to about 110° C. for about 2 minutes (called the "reheat" stage). The softened preform is then put into a container mold, a mechanical stretch rod is inserted into the preform to guide and stretch the preform in the axial direction. Pressurized air is introduced in two steps: as a pre-blow of about 10-12 bar for about 0.12 seconds followed by a second-blow of about 35-38 bar to complete the blow molding of the bottle at a blow mold temperature of about 17° C. The stretch ratio (axial to hoop) of the final article is about 8:1.

All percentages are weight percentages based on the weight of the composition, unless otherwise specified. All ratios are weight ratios, unless specifically stated otherwise. All numeric ranges are inclusive of narrower ranges; delineated upper and lower range limits are interchangeable to create further ranges not explicitly delineated. The number of significant digits conveys neither limitation on the indicated amounts nor on the accuracy of the measurements. All measurements are understood to be made at about 25° C. and at ambient conditions, where "ambient conditions" means conditions under about one atmosphere pressure and at about 50% relative humidity.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A blow molded article comprising:
a body portion including one or more walls surrounding an interior space, the one or more walls having an article inner surface, an article outer surface, and a wall thickness, wherein at least a portion of the one or more walls includes one or more effect structures each having an effect surface normal having an orientation;
a first region including a plurality of first effect structures having a first Average Normal Orientation;
a second region including a plurality of second effect structures having a second Average Normal Orientation which is different from the first Average Normal Orientation; and
a visual effect resulting from the difference between the first Average Normal Orientation of the effect structures in the first region and the second Average Normal Orientation of the effect structures in the second region.

2. The blow molded article of claim 1 wherein the visual effect is a dimensional visual effect.

3. The blow molded article of claim 1, wherein the visual effect has having an LOI of at least 3.

4. The blow molded article of claim 3 wherein the LOI of the visual effect is between 5 and 87.

5. The blow molded article of claim 1 wherein the visual effect includes a third region including a plurality of third effect structures, the third effect structures having a third Average Normal Orientation that is different from the first Average Normal Orientation and the second Average Normal Orientation.

6. The blow molded article of claim 5 wherein the third Average Normal Orientation has an absolute value difference of at least 3 degrees from the orientation of the first Average Normal Orientation.

7. The blow molded article of claim 6 wherein effect structures having the first Average Normal Orientation are disposed between effect structures having the second Average Normal Orientation and effect structures having the third Average Normal Orientation.

8. The blow molded article of claim 6 wherein effect structures having the second Average Normal orientation are disposed between effect structures having the first Average Normal Orientation.

9. The blow molded article of claim 8 wherein effect structures having the third Average Normal orientation are disposed between effect structures having the first Average Normal Orientation.

10. The blow molded article of claim 1 wherein the article is formed from a preform having a preform body, wherein the preform body has a preform inner surface and a preform outer surface and the preform outer surface has one or more cavities creating a three-dimensional pattern thereon.

11. The blow molded article of claim 10 wherein the three-dimensional pattern on the preform corresponds to at least one cavity region on the article outer surface.

12. The blow molded article of claim 11 wherein the cavity region includes at least one cavity central region and at least two cavity side regions adjacent to and disposed on opposite sides of each cavity central region, wherein the one or more first effect structures having the first Average Normal Orientation is disposed in the at least one cavity central region and the one or more second effect structures having the second Average Normal Orientation is disposed in at least one of the cavity side regions.

13. The blow molded article of claim 12 further including a third region including one or more third effect structures having a third Average Normal Orientation that is different from the first Average Normal Orientation and the second Average Normal Orientation, the third region being disposed in at least another of the cavity side regions.

14. The article of claim 1 wherein the predetermined feature creates a topography on the outer surface, the topography having a Maximum Peak/Pit Height less than 750 microns.

15. The article of claim 1 wherein the article includes a label disposed at least partially over the portion of the article outer surface corresponding to the visual effect.

16. The article of claim 1 wherein the outer surface has at least a portion which corresponds to the visual effect, at least the portion of the visual effect includes one or more cavity regions, and wherein at least one of the cavity regions has a Root Mean Square Roughness of less than or equal to 10 microns.

17. The article of claim 1 wherein the one or more walls include a first layer and a second layer that are different from each outer in one or more of the following characteristics: color, material, thickness, additive, pigment, opacity, gloss, optical property, amount of recycled material, recycled material, or strength.

18. The article of claim 1 wherein the wall thickness varies in at least the portion of the wall including the visual effect.

19. A preform for blow molding an article, the preform formed from a thermoplastic material, the preform comprising
a body having one or more walls extending from an opening to a base, the walls having one or more layers;
a preform outer surface;
a preform inner surface;
a three-dimensional pattern of one or more cavities or protrusions formed on one or more of the layers of the preform; and
a plurality of effect structures disposed in the one or more layers of the one or more walls, the plurality of effect structures each having an effect surface.

20. The preform of claim 19 wherein the one or more walls of the preform have an outer layer and an inner layer, and wherein the outer layer is translucent, transparent, and/or free from effect structures.

21. The preform of claim 19 wherein the three-dimensional pattern includes one or more cavities formed by: mechanical etching, thermal-etching, chemical etching, laser etching, preform mold design, or a combination thereof.

22. The preform of claim 19 wherein the one or more layers differ in at least one of the following characteristics: colors, translucency, material, and thicknesses.

* * * * *